(12) United States Patent
Fujisawa et al.

(10) Patent No.: US 12,399,106 B2
(45) Date of Patent: Aug. 26, 2025

(54) DETECTION DEVICE

(71) Applicant: Magnolia White Corporation, Tokyo (JP)

(72) Inventors: Akihiko Fujisawa, Tokyo (JP); Kaoru Ito, Tokyo (JP); Kazunori Yamaguchi, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 66 days.

(21) Appl. No.: 18/372,516

(22) Filed: Sep. 25, 2023

(65) Prior Publication Data

US 2024/0102917 A1    Mar. 28, 2024

(30) Foreign Application Priority Data

Sep. 27, 2022 (JP) .................. 2022-154045

(51) Int. Cl.
*G01N 21/01* (2006.01)

(52) U.S. Cl.
CPC .................. *G01N 21/01* (2013.01)

(58) Field of Classification Search
CPC ........... G01N 21/01; G01N 2015/1006; G01N 15/1436; G06V 40/145; G06V 40/1318
USPC ....................................... 356/244
See application file for complete search history.

(56) References Cited

U.S. PATENT DOCUMENTS

2019/0324281 A1* 10/2019 Diebold ............. G02B 19/0052
2019/0391013 A1* 12/2019 Morgan, III .......... G01J 3/0294

FOREIGN PATENT DOCUMENTS

JP        H06-261737 A      9/1994

* cited by examiner

*Primary Examiner* — Md M Rahman
(74) *Attorney, Agent, or Firm* — K&L Gates LLP

(57) ABSTRACT

According to an aspect, a detection device includes: photodiodes that are provided on a substrate; light-emitting elements that are arranged so as to face the photodiodes; and a light-transmitting placement substrate that is disposed between the photodiodes and the light-emitting elements and on which target objects are to be placed. The photodiodes, the placement substrate, and the light-emitting elements are arranged in the order as listed, in a direction orthogonal to the substrate. A light-emitting element of the light-emitting elements corresponding to the photodiode to be detected is controlled to be lit, and another light-emitting element of the light-emitting elements corresponding to the photodiode not to be detected is controlled to be unlit. The photodiodes to be detected output sensor values based on light from the lit-up light-emitting elements. The light-emitting elements adjacent to the lit-up light-emitting elements at least in row and column directions are controlled to be unlit.

10 Claims, 18 Drawing Sheets

DETECTION DEVICE

CROSS-REFERENCE TO RELATED APPLICATION

This application claims the benefit of priority from Japanese Patent Application No. 2022-154045 filed on Sep. 27, 2022, the entire contents of which are incorporated herein by reference.

BACKGROUND

1. Technical Field

What is disclosed herein relates to a detection device.

2. Description of the Related Art

Japanese Patent Application Laid-open Publication No. H06-261737 (JP-A-HOG-261737) discloses a biosensor that includes a solid-state imaging element, a culture vessel held on the upper side of an imaging surface of the solid-state imaging element, cells contained in the culture vessel and a culture medium (agar medium) for growing the cells, and a light-emitting element for emitting light into the culture vessel. In the biosensor of JP-A-HOG-261737, one light-emitting element is disposed for a plurality of cells (target objects) in the culture vessel.

Such a detection device is required to detect a plurality of target objects in a detection area having a larger area, which requires a plurality of light-emitting elements. In this case, one target object is irradiated with light in different directions from the light-emitting elements, causing blurring of an image captured by an optical sensor (solid-state imaging element in JP-A-HOG-261737).

For the foregoing reasons, there is a need for a detection device that includes a plurality of light-emitting elements and a plurality of photodiodes and is capable of improving the detection accuracy.

SUMMARY

According to an aspect, a detection device includes: a plurality of photodiodes that are provided on a substrate; a plurality of light-emitting elements that are arranged so as to face the photodiodes; and a light-transmitting placement substrate that is disposed between the photodiodes and the light-emitting elements and on which a plurality of target objects are to be placed. The photodiodes, the placement substrate, and the light-emitting elements are arranged in the order as listed, in a direction orthogonal to the substrate. A light-emitting element of the light-emitting elements corresponding to the photodiode to be detected is controlled to be lit, and another light-emitting element of the light-emitting elements corresponding to the photodiode not to be detected is controlled to be unlit. The photodiodes to be detected output sensor values based on light from the lit-up light-emitting elements. The light-emitting elements adjacent to the lit-up light-emitting elements at least in row and column directions are controlled to be unlit.

DETAILED DESCRIPTION

Figure 1:
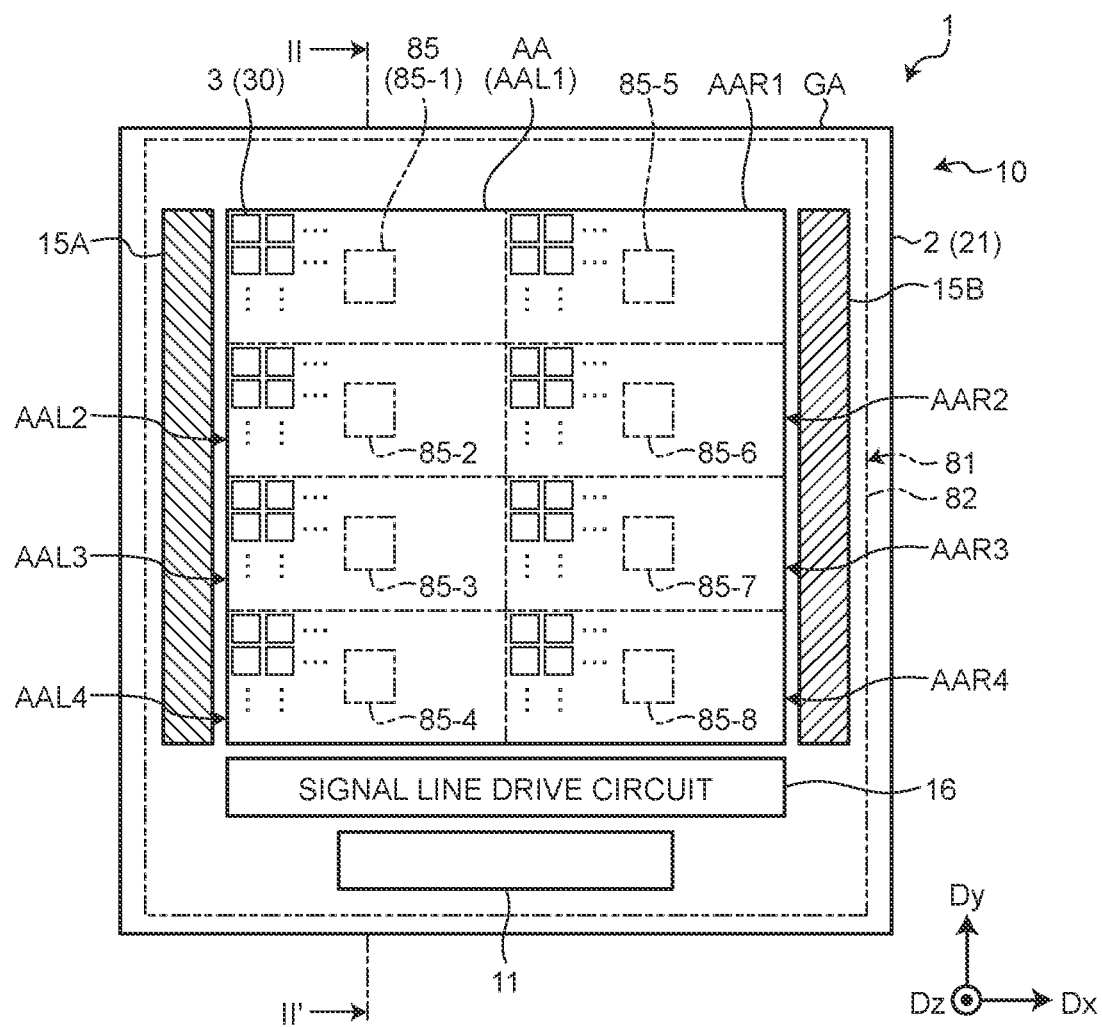
FIG. 1 is a plan view schematically illustrating a detection device according to a first embodiment.

The following describes modes (embodiments) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

First Embodiment

FIG. 1 is a plan view schematically illustrating a detection device according to a first embodiment. As illustrated in FIG. 1, a detection device 1 includes an optical sensor 10, a light source device 81, and a placement substrate 101 on which a target object 100 is to be placed (refer to FIG. 2).

The optical sensor 10 includes an array substrate 2, and a plurality of sensor pixels 3 (photodiodes 30), gate line drive circuits 15A and 15B, a signal line drive circuit 16, and a detection control circuit 11 that are formed on the array substrate 2.

The array substrate 2 is formed using a substrate 21 as a base body. The sensor pixels 3 include the respective photodiodes 30, a plurality of drive transistors Tr (refer to FIG. 5), and various types of wiring. The array substrate 2 with the photodiodes 30 formed thereon is a drive circuit board that drives the sensor for each predetermined detection area, and is also called a backplane or an active matrix substrate.

The substrate 21 has a detection area AA and a peripheral area GA. The detection area AA is an area provided with the sensor pixels 3 (photodiodes 30). The peripheral area GA is an area between the outer perimeter of the detection area AA and outer edges of the substrate 21 and is an area not provided with the sensor pixels 3. The gate line drive circuits 15A and 15B, the signal line drive circuit 16, and the detection control circuit 11 are provided in the peripheral area GA.

In the following description, a first direction Dx is one direction in a plane parallel to the substrate 21. A second direction Dy is one direction in the plane parallel to the substrate 21, and is a direction orthogonal to the first direction Dx. The second direction Dy may non-orthogonally intersect the first direction Dx. A third direction Dz is a direction orthogonal to the first direction Dx and the second direction Dy and is a direction normal to a principal surface of the substrate 21. The term "plan view" refers to a positional relation when viewed in a direction orthogonal to the substrate 21.

Each of the sensor pixels 3 is an optical sensor including a corresponding one of the photodiodes 30 as a sensor element. Each of the photodiodes 30 outputs an electrical signal corresponding to light emitted thereto. More specifically, the photodiode 30 is an organic photodiode (OPD) using an organic semiconductor or a positive-intrinsic-negative (PIN) photodiode. The sensor pixels 3 (photodiodes 30) are arranged in a matrix having a row-column configuration in the detection area AA of the substrate 21.

The detection control circuit 11 is a circuit that supplies control signals Sa, Sb, and Sc (refer to FIG. 3) to the gate line drive circuits 15A and 15B and the signal line drive circuit 16, respectively, to control operations of these drive circuits. Specifically, the gate line drive circuit 15A outputs a reset control signal RST to a reset transistor TrR (refer to FIG. 5) based on the control signal Sa. The gate line drive circuit 15B outputs a gate drive signal VGL to a gate line GL (refer to FIG. 5) based on the control signal Sb. The signal line drive circuit 16 electrically couples a signal line SL selected based on the control signal Sc to the detection control circuit 11. The detection control circuit 11 includes a signal processing circuit that processes a detection signal Vdet from each of the photodiodes 30.

Each of the photodiodes 30 included in the sensor pixels 3 performs detection in accordance with the reset control signal RST and the gate drive signal VGL supplied from the gate line drive circuits 15A and 15B. Each of the photodiodes 30 outputs the electrical signal corresponding to the light emitted thereto as the detection signal Vdet to the signal line drive circuit 16. The detection control circuit 11 processes the detection signals Vdet from the photodiodes 30 and outputs sensor values So based on the detection signals Vdet to a host integrated circuit (IC) 70 (refer to FIG. 3). Thus, the detection device 1 detects information on the target object 100.

The light source device 81 includes a light-emitting element substrate 82 and a plurality of light-emitting elements 85. The light-emitting elements 85 are provided on the light-emitting element substrate 82 and are arranged so as to face the photodiodes 30 of the optical sensor 10. Each of the light-emitting elements 85 is made up of a light-emitting diode, for example.

Light-emitting elements 85-1, 85-2, 85-3, and 85-4 of the light-emitting elements 85 are arranged in the second direction Dy (column direction). Light-emitting elements 85-5, 85-6, 85-7, and 85-8 are arranged in the second direction Dy (column direction) and are arranged adjacent to the right side (in the first direction Dx) of the light-emitting elements 85-1, 85-2, 85-3, and 85-4, respectively.

In the following description, the light-emitting elements 85-1, 85-2, 85-3, and 85-4 may be referred to as the light-emitting elements 85 arranged in a first column, and the light-emitting elements 85-5, 85-6, 85-7, and 85-8 may be referred to as the light-emitting elements 85 arranged in a second column. In the following description, the light-emitting elements 85-1, 85-2, 85-3, 85-4, 85-5, 85-6, 85-7, and 85-8 will each be simply referred to as a light-emitting element 85 when they need not be distinguished from one another.

The detection area AA of the optical sensor 10 is divided into a plurality of detection blocks AAL1, AAL2, AAL3, AAL4, AAR1, AAR2, AAR3, and AAR4. The detection blocks AAL1, AAL2, AAL3, AAL4, AAR1, AAR2, AAR3, and AAR4 are provided correspondingly to the light-emitting elements 85-1, 85-2, 85-3, 85-4, 85-5, 85-6, 85-7, and 85-8, respectively. The photodiodes 30 are arranged in a matrix in each of the detection blocks AAL1, AAL2, AAL3, AAL4, AAR1, AAR2, AAR3, and AAR4.

In the following description, the detection blocks AAL1, AAL2, AAL3, AAL4, AAR1, AAR2, AAR3, and AAR4 may be referred to as detection blocks AAL and AAR when they need not be distinguished from one another.

The detection blocks AAL1, AAL2, AAL3, and AAL4 are arranged in the second direction Dy (column direction). The detection blocks AAR1, AAR2, AAR3, and AAR4 are arranged in the second direction Dy (column direction), and are arranged adjacent to the right side (in the first direction Dx) of the detection blocks AAL1, AAL2, AAL3, and AAL4, respectively.

The detection blocks AAL1, AAL2, AAL3, and AAL4 are arranged correspondingly to the light-emitting elements 85 arranged in the first column. The photodiodes 30 in the detection blocks AAL1, AAL2, AAL3, and AAL4 may be referred to as the photodiodes 30 arranged in the first column. The detection blocks AAR1, AAR2, AAR3, and AAR4 are arranged correspondingly to the light-emitting elements 85 arranged in the second column. The photodiodes 30 in the detection blocks AAR1, AAR2, AAR3, and AAR4 may be referred to as the photodiodes 30 arranged in the second column.

The width in the second direction Dy of each of the detection blocks AAL and AAR is equal to the arrangement pitch in the second direction Dy of the light-emitting elements 85. The width in the first direction Dx of each of the detection blocks AAL and AAR is approximately half the width in the first direction Dx of the detection area AA.

In each of the detection blocks AAL and AAR, at least one of the photodiodes 30 is arranged so as to overlap a corresponding one of the light-emitting elements 85 in plan view. For example, at least one of the photodiodes 30 in the detection block AAL1 is arranged so as to overlap the light-emitting element 85-1 in plan view.

Figure 2:
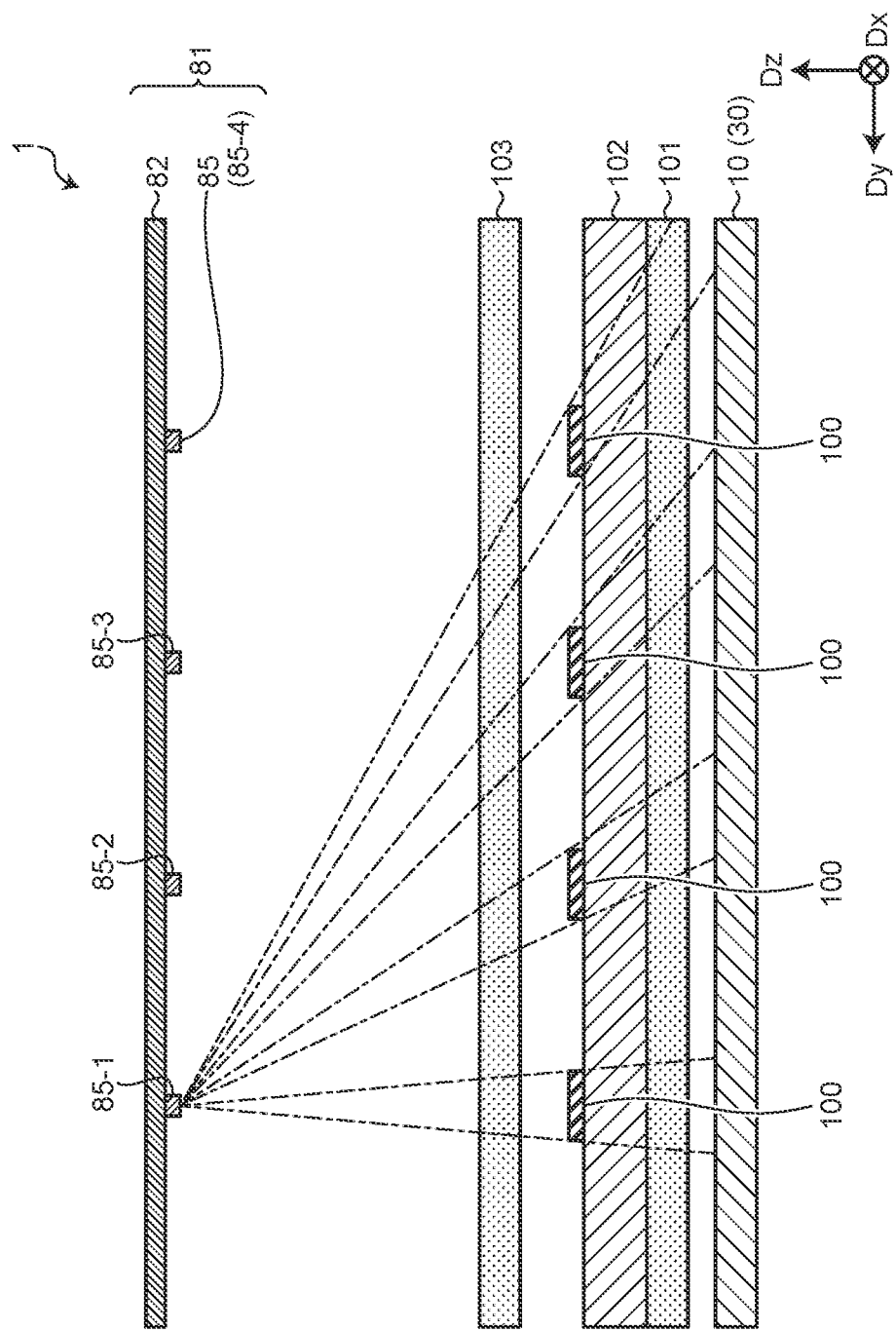
FIG. 2 is a sectional view along II-II' of FIG. 1.

FIG. 2 is a sectional view along II-II' of FIG. 1. As illustrated in FIG. 2, the detection device 1 is arranged in the order of the optical sensor 10 (photodiodes 30), the placement substrate 101, and the light source device 81 (light-emitting elements 85), in the third direction Dz.

The target object 100 is, for example, a microscopic object such as cells. The detection device 1 is a biosensor that detects the microscopic object such as the cells. The placement substrate 101 is a light-transmitting plate-like member formed of glass, for example. A plurality of the target objects 100 are placed together with a culture medium (agar medium) 102 on the placement substrate 101. A cover member 103 to cover the target objects 100 is provided on the upper side of the placement substrate 101. The placement substrate 101 and the cover member 103 are petri dishes, for example.

The detection device 1 is, however, not limited to the biosensor, but may be configured as a fingerprint detection device to detect a fingerprint or a vein detection device to detect a vascular pattern of, for example, veins. In that case, the target object 100 may be a living body such as a finger, a palm, or a wrist.

The target objects 100 are arranged on one placement substrate 101. In the example illustrated in FIG. 2, the target object 100 is arranged in each of areas (detection blocks AAL1, AAL2, AAL3, and AAL4 (refer to FIG. 1)) corresponding to the light-emitting elements 85-1, 85-2, 85-3, and 85-4. That is, the target object 100 is arranged between, for example, the light-emitting element 85-1 and the photodiode 30 in the corresponding detection block AAL1 (refer to FIG. 1) in the third direction Dz. Another of the target objects 100 is arranged between the light-emitting element 85-2 and the photodiode 30 in the corresponding detection block AAL2 (refer to FIG. 1).

For ease of understanding, one target object 100 is arranged correspondingly to one light-emitting element 85 in FIG. 2, but the arrangement is not limited to this arrangement. More than one target object 100 may be arranged correspondingly to one light-emitting element 85, or the detection blocks AAL and AAR may be present in which the target object 100 is not arranged correspondingly to one light-emitting element 85.

The light source device 81 turns on at least one of the light-emitting elements 85 (for example, the light-emitting element 85-1) and does not turn on the other light-emitting elements 85 (light-emitting elements 85-2, 85-3, and 85-4). Light emitted from the light-emitting element 85-1 passes through the target object 100 corresponding to the light-emitting element 85-1 and the placement substrate 101 and irradiates the photodiodes 30 of the optical sensor 10. The light emitted from light-emitting element 85-1 spreads and is also emitted to the target objects 100 arranged correspondingly to the other light-emitting elements 85-2, 85-3, and 85-4. The light source device 81 then sequentially turns on the light-emitting elements 85 in a time-division manner. A lighting pattern of the light-emitting elements 85 and a detection operation example of the optical sensor 10 will be described later with reference to FIG. 8 and subsequent drawings.

Figure 3:
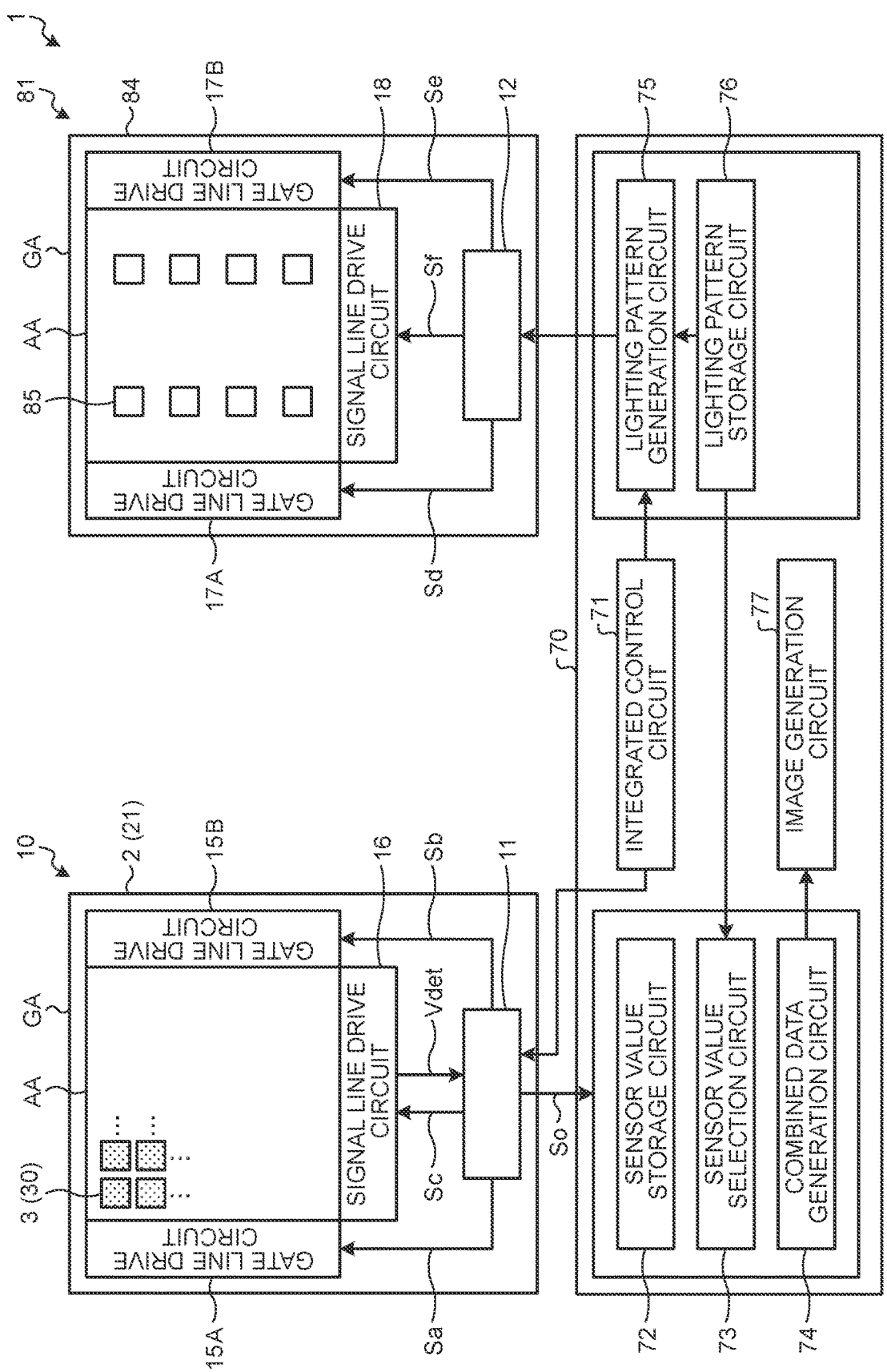
FIG. 3 is a block diagram illustrating a configuration example of the detection device according to the first embodiment.

FIG. 3 is a block diagram illustrating a configuration example of the detection device according to the first embodiment. As illustrated in FIG. 3, the detection device 1 further includes the host IC 70 that controls the optical sensor 10 and the light source device 81. The light source device 81 includes an array substrate 84, and gate line drive circuits 17A and 17B and a signal line drive circuit 18, and a light-emitting element control circuit 12 that are formed on the array substrate 84.

The light-emitting elements 85 are arranged in two columns in an area overlapping the detection area AA of the array substrate 84. The array substrate 84 is formed using the light-emitting element substrate 82 (refer to FIGS. 1 and 2) as a base body, and is a drive circuit board that drives the light-emitting elements 85 by switching between on (lit) and off (unlit) of each of the light-emitting elements 85.

The light-emitting element control circuit 12 is a circuit that supplies control signals Sd, Se, and Sf to the gate line drive circuits 17A and 17B and the signal line drive circuit 18, respectively, to control operations of these drive circuits. Specifically, the gate line drive circuits 17A and 17B output drive signals to the gate lines (not illustrated) based on the control signals Sd and Se to select the light-emitting elements 85 in a predetermined row. The signal line drive circuit 18 supplies a light-emitting element control signal to the selected signal line (not illustrated) based on the control signal Sf. Thus, the light source device 81 can switch between the lighting and the non-lighting of each of the light-emitting elements 85.

The array substrate 84 of the light source device 81 is what is called an active matrix substrate, but is not limited thereto. The on/off of the light-emitting elements 85 may be controlled in any way; for example, the light-emitting element control circuit 12 may individually control each of the light-emitting elements 85.

Figure 4:
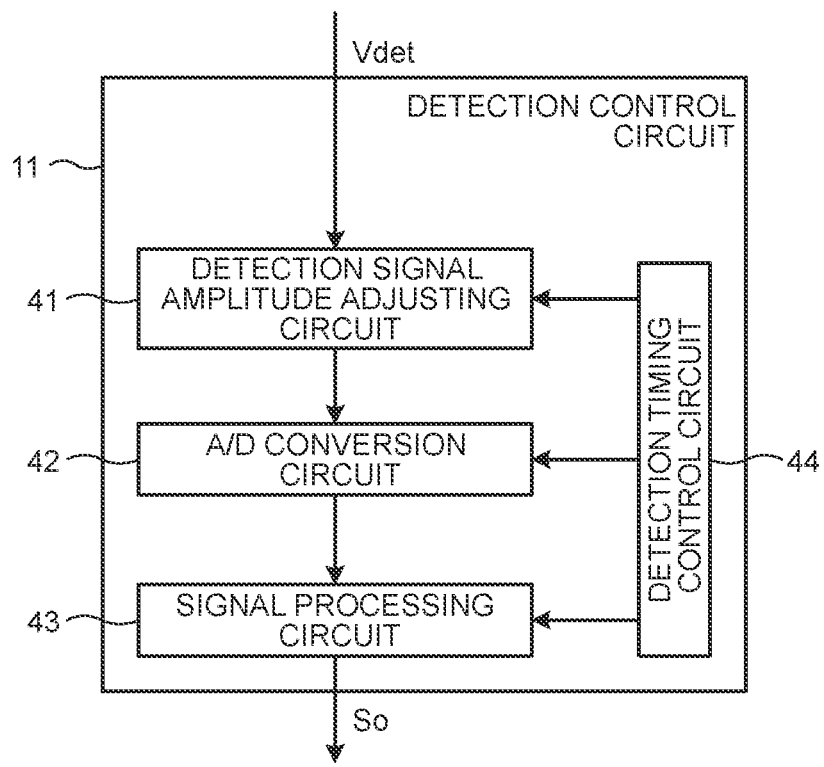
FIG. 4 is a block diagram illustrating a configuration example of a detection control circuit according to the first embodiment.

FIG. 4 is a block diagram illustrating a configuration example of the detection control circuit according to the first embodiment. As illustrated in FIG. 4, the detection control circuit 11 includes a detection signal amplitude adjusting circuit 41, an analog-to-digital (A/D) conversion circuit 42, a signal processing circuit 43, and a detection timing control circuit 44. The detection timing control circuit 44 performs control to cause the detection signal amplitude adjusting circuit 41, the A/D conversion circuit 42, and the signal processing circuit 43 to operate in synchronization with one another based on a control signal supplied from the host IC 70 (refer to FIG. 3).

The detection signal amplitude adjusting circuit 41 and the A/D conversion circuit 42 included in the detection control circuit 11 are a detection circuit that is coupled to the signal lines SL (refer to FIG. 5) and processes the detection signals Vdet. The detection signal amplitude adjusting circuit 41 is a circuit that adjusts the amplitude of the detection signals Vdet output from the photodiodes 30, and includes an amplifier, for example. The A/D conversion circuit 42 converts analog signals output from the detection signal amplitude adjusting circuit 41 into digital signals. The signal processing circuit 43 is a circuit that processes the digital signals from the A/D conversion circuit 42 and transmits the sensor values So to the host IC 70.

Referring back to FIG. 3, the host IC 70 includes an integrated control circuit 71 that synchronously controls the optical sensor 10 and the light source device 81. Based on a control signal from the integrated control circuit 71 of the host IC 70, the switching of the lighting pattern of on and off of the light-emitting elements 85 of the light source device 81 is controlled synchronously with the detection (scanning) of the photodiodes 30 of the optical sensor 10.

The host IC 70 also includes a sensor value storage circuit 72, a sensor value selection circuit 73, and a combined data generation circuit 74 as control circuits for the optical sensor 10. The sensor value storage circuit 72 is a circuit that stores therein the sensor values So output from the detection control circuit 11 of the optical sensor 10.

The sensor value selection circuit 73 is a circuit that selects sensor values So-L and So-R (refer to FIG. 10) of the detection blocks AAL and AAR to be detected from among the sensor values So output from the photodiodes 30 in the detection area AA. In more detail, based on the lighting pattern of the light-emitting elements 85 acquired from a lighting pattern storage circuit 76, the sensor value selection circuit 73 selects the sensor values So-L and So-R (refer to FIG. 10) of the detection blocks AAL and AAR corresponding to the light-emitting elements 85 that are lit. Based on the lighting pattern of the light-emitting elements 85 acquired from the lighting pattern storage circuit 76, the sensor value selection circuit 73 does not select the sensor values So-L and So-R (refer to FIG. 10) of the detection blocks AAL and AAR corresponding to the light-emitting elements 85 that are unlit. The combined data generation circuit 74 is a circuit that generates combined data SoA by integrating the selected sensor values So-L and So-R for each sub-frame period SF (refer to FIG. 8).

The host IC 70 includes a lighting pattern generation circuit 75 and the lighting pattern storage circuit 76 as control circuits for the light source device 81. The lighting pattern storage circuit 76 is a circuit that stores therein information on the lighting pattern of on (lit) and off (unlit) of the light-emitting elements 85 for each sub-frame period SF (refer to FIG. 8). The lighting pattern generation circuit 75 is a circuit that generates various control signals based on the lighting pattern information in the lighting pattern storage circuit 76. The lighting pattern generation circuit 75 outputs the light-emitting element control signal containing the information on the lighting pattern of on and off of the light-emitting elements 85 for each sub-frame period SF, to the light-emitting element control circuit 12.

The host IC 70 further includes an image generation circuit 77. The image generation circuit 77 is a circuit that generates an image based on the combined data SoA from the combined data generation circuit 74 and position information on the photodiodes 30 in the detection area AA.

The configurations of the host IC 70 and the detection control circuit 11 illustrated in FIGS. 3 and 4 are merely exemplary and can be changed as appropriate. The light source device 81 includes the two gate line drive circuits 17A and 17B, but may include one gate line drive circuit.

Figure 5:
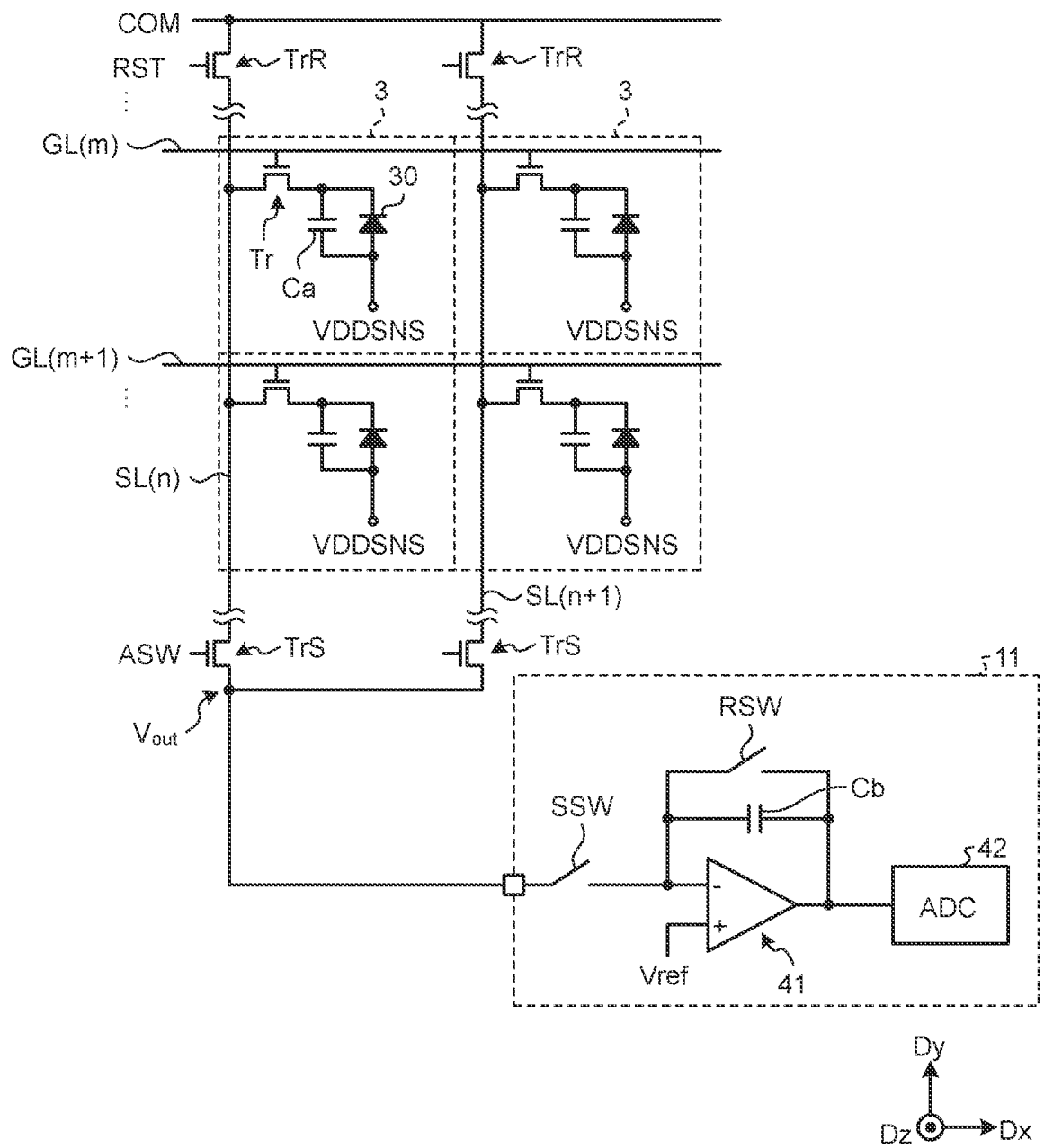
FIG. 5 is a circuit diagram illustrating an optical sensor according to the first embodiment.

The following describes a configuration example of the optical sensor 10. FIG. 5 is a circuit diagram illustrating the optical sensor according to the first embodiment. FIG. 5 also illustrates a circuit configuration of a part of the detection control circuit 11. As illustrated in FIG. 5, the sensor pixel 3 includes the photodiode 30, a capacitive element Ca, and the drive transistor Tr. The capacitive element Ca is capacitance (sensor capacitance) generated in the photodiode 30 and is equivalently coupled in parallel to the photodiode 30.

FIG. 5 illustrates two gate lines GL(m) and GL(m+1) arranged in the second direction Dy among the gate lines GL. Each of the gate lines GL extends in the first direction Dx. FIG. 5 also illustrates two signal lines SL(n) and SL(n+1) arranged in the first direction Dx among the signal lines SL. Each of the signal lines SL extends in the second direction Dy. The sensor pixel 3 is an area surrounded by the gate lines GL and the signal lines SL. The gate lines GL are coupled to the gate line drive circuit 15B. The signal lines SL are coupled to the detection circuit (refer to FIG. 4).

The drive transistors Tr are provided correspondingly to the photodiodes 30. Each of the drive transistors Tr is formed of a thin-film transistor, and in this example, formed of an n-channel metal oxide semiconductor (MOS) thin-film transistor (TFT).

Each of the gate lines GL is coupled to the gates of the drive transistors Tr arranged in the first direction Dx. Each of the signal lines SL is coupled to one of the source and the drain of each of the drive transistors Tr arranged in the second direction Dy. The other of the source and the drain of the drive transistor Tr is coupled to the cathode of the photodiode 30 and the capacitive element Ca.

The photodiodes 30 are arranged in a matrix in the detection area AA of the substrate 21 and are electrically coupled to the gate lines GL and the signal lines SL through the drive transistors Tr. The anode of the photodiode 30 is supplied with a sensor power supply signal (sensor power supply voltage) VDDSNS from the detection control circuit 11 (refer to FIG. 1). The signal line SL and the capacitive element Ca are supplied with a sensor reference voltage COM that serves as an initial potential of the signal line SL and the capacitive element Ca from the detection control circuit 11 through the reset transistor TrR.

When the sensor pixel 3 is irradiated with light in an exposure period, a current corresponding to the amount of the light flows through the photodiode 30. As a result, an electric charge is stored in the capacitive element Ca. After the drive transistor Tr is turned on in a read period, a current corresponding to the electric charge stored in the capacitive element Ca flows through the signal line SL. The signal line SL is coupled to the detection control circuit 11 through an output transistor TrS of the signal line drive circuit 16. As a result, the detection device 1 can detect a signal corresponding to the amount of the light received by the photodiode 30 for each of the sensor pixels 3.

During the read period, a switch SSW is turned on to couple the detection control circuit 11 to the signal line SL. The detection signal amplitude adjusting circuit 41 of the detection control circuit 11 amplifies a voltage to a voltage corresponding to the electric charge supplied from the signal line SL. A reference potential (Vref) having a fixed potential is supplied to a non-inverting input portion (+) of the detection signal amplitude adjusting circuit 41, and the signal line SL is coupled to an inverting input portion (−) of the detection signal amplitude adjusting circuit 41. In the present embodiment, the same signal as the sensor reference voltage COM is supplied as the reference potential (Vref) voltage. The signal processing circuit 43 (refer to FIG. 4) calculates, as the sensor value So, the difference between the detection signal Vdet when light irradiates the photodiode 30 and the detection signal Vdet when light does not irradiate the photodiode 30. The detection signal amplitude adjusting circuit 41 includes a capacitive element Cb and a reset switch RSW. During a reset period, the reset switch RSW is turned on to reset the electric charge of the capacitive element Cb.

The drive transistor Tr is not limited to being formed of the n-channel TFT, but may be formed of a p-channel TFT. The pixel circuit of the sensor pixel 3 illustrated in FIG. 5 is merely exemplary. The sensor pixel 3 may be provided with a plurality of transistors corresponding to one photodiode 30.

Figure 6:
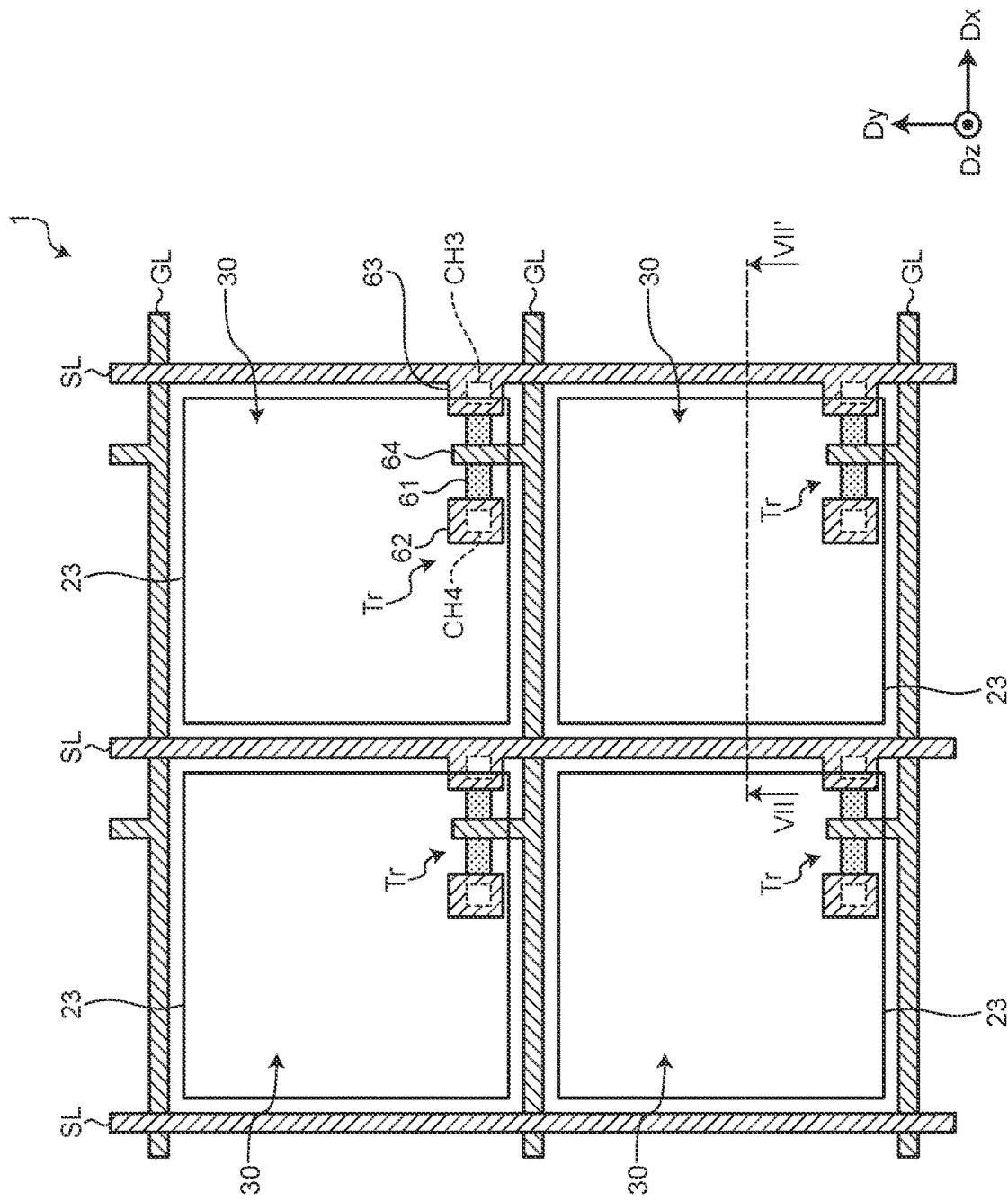
FIG. 6 is a plan view illustrating an enlarged view of four photodiodes of the optical sensor according to the first embodiment.

FIG. 6 is a plan view illustrating an enlarged view of four of the photodiodes of the optical sensor according to the first embodiment. A lower electrode 23 of the photodiode 30 is provided in an area surrounded by two of the gate lines GL and two of the signal lines SL.

The drive transistor Tr includes a semiconductor layer 61, a source electrode 62, a drain electrode 63, and a gate electrode 64. The semiconductor layer 61 extends along the gate line GL and is provided so as to intersect the gate electrode 64 in plan view. The gate electrode 64 is coupled to the gate line GL and extends in a direction orthogonal to the gate line GL. One end of the semiconductor layer 61 is coupled to the source electrode 62 through a contact hole CH4. The lower electrode 23 is electrically coupled to the source electrode 62 of the drive transistor Tr through a contact hole (not illustrated). As a result, the drive transistor Tr is electrically coupled to the photodiode 30. The other end of the semiconductor layer 61 is coupled to the drain electrode 63 through a contact hole CH3. The drain electrode 63 is coupled to the signal line SL.

Figure 7:
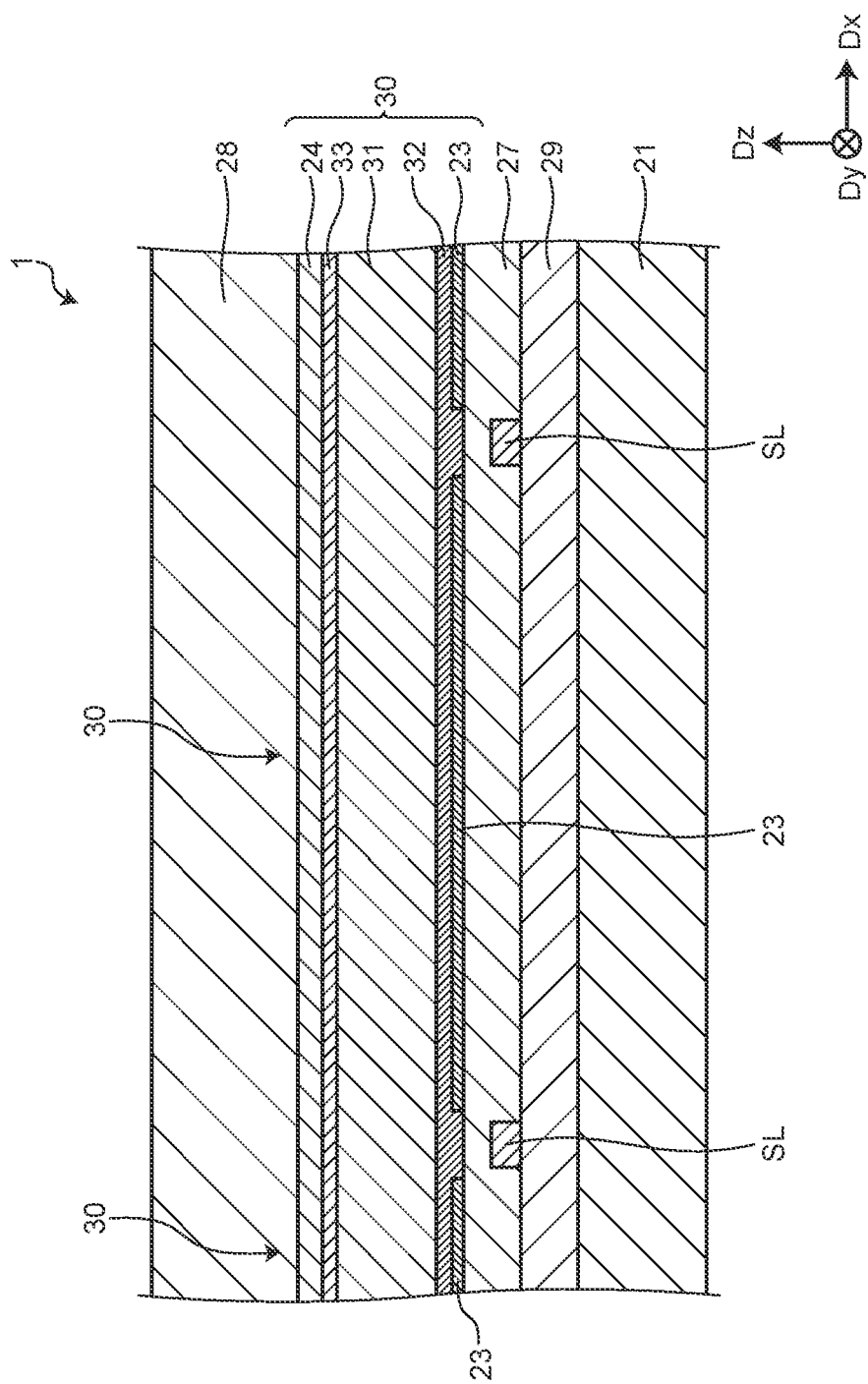
FIG. 7 is a sectional view along VII-VII' of FIG. 6.

FIG. 7 is a sectional view along VII-VII' of FIG. 6. As illustrated in FIG. 7, a circuit forming layer 29, an insulating film 27, the photodiode 30, and a sealing film 28 are stacked in this order on the substrate 21. The substrate 21 is an insulating substrate and is made using, for example, a glass substrate of, for example, quartz or alkali-free glass. The circuit forming layer 29 is a layer that is provided on the substrate 21, and in which various transistors, such as the drive transistor Tr illustrated in FIGS. 5 and 6 and various types of wiring are formed. FIG. 7 illustrates the signal lines SL coupled to the drive transistors Tr. The insulating film 27 is provided on the circuit forming layer 29 including the drive transistors Tr so as to cover the signal lines SL.

The photodiode 30 is provided on the insulating film 27. In more detail, the photodiode 30 includes the lower electrode 23, a lower buffer layer 32, an active layer 31, an upper buffer layer 33, and an upper electrode 24. The photodiode 30 is stacked in the order of the lower electrode 23, the lower buffer layer 32 (hole transport layer), the active layer 31, the upper buffer layer 33 (electron transport layer), and the upper electrode 24 in the direction orthogonal to the substrate 21.

The lower electrode 23 is an anode electrode of the photodiode 30 and is formed of, for example, a light-transmitting conductive material such as indium tin oxide (ITO).

The active layer 31 changes in characteristics (for example, voltage-current characteristics and resistance value) in accordance with light emitted thereto. An organic material is used as a material of the active layer 31. Specifically, the active layer 31 has a bulk heterostructure containing a mixture of a p-type organic semiconductor and an n-type fullerene derivative (PCBM) that is an n-type organic semiconductor. As the active layer 31, low-molecular-weight organic materials can be used including, for example, fullerene (C60), phenyl-C61-butyric acid methyl ester (PCBM), copper phthalocyanine (CuPc), fluorinated copper phthalocyanine (F16CuPc), 5,6,11,12-tetraphenyltetracene (rubrene), and perylene diimide (PDI) (derivative of perylene).

The active layer 31 can be formed by a vapor deposition process (dry process) using any of the low-molecular-weight organic materials listed above. In this case, the active layer 31 may be, for example, a multilayered film of CuPc and F16CuPc, or a multilayered film of rubrene and C60. The active layer 31 can also be formed by a coating process (wet process). In this case, the active layer 31 is made using a material obtained by combining any of the above-listed low-molecular-weight organic materials with a high-molecular-weight organic material. As the high-molecular-weight organic material, for example, poly(3-hexylthiophene) (P3HT) and F8-alt-benzothiadiazole (F8BT) can be used. The active layer 31 can be a film made of a mixture of P3HT and PCBM, or a film made of a mixture of F8BT and PDI.

The lower buffer layer 32 is a hole transport layer and the upper buffer layer 33 is an electron transport layer. The lower buffer layer 32 and the upper buffer layer 33 are provided to facilitate holes and electrons generated in the active layer 31 to reach the lower electrode 23 or the upper electrode 24. The lower buffer layer 32 (hole transport layer) is in direct contact with the top of the lower electrode 23 and is also provided in an area between the adjacent lower electrodes 23. The active layer 31 is in direct contact with the top of the lower buffer layer 32. The material of the hole transport layer is an oxide metal layer. For example, tungsten oxide ($WO_3$) or molybdenum oxide is used as the oxide metal layer.

The upper buffer layer 33 (electron transport layer) is in direct contact with the top of the active layer 31, and the upper electrode 24 is in direct contact with the top of the upper buffer layer 33. Polyethylenimine ethoxylated (PEIE) is used as a material of the electron transport layer.

The materials and the manufacturing methods of the lower buffer layer 32, the active layer 31, and the upper buffer layer 33 are merely exemplary, and other materials and manufacturing methods may be used. For example, each of the lower buffer layer 32 and the upper buffer layer 33 is not limited to a single-layer film, but may be formed as a multilayered film that includes an electron block layer and a hole block layer.

The upper electrode 24 is provided on the upper buffer layer 33. The upper electrode 24 is a cathode electrode of the photodiode 30 and is continuously formed over the entire detection area AA. In other words, the upper electrode 24 is continuously provided in the upper side layer of the photodiodes 30. The upper electrode 24 faces the lower electrodes 23 with the lower buffer layer 32, the active layer 31, and the upper buffer layer 33 interposed therebetween. The upper electrode 24 is formed of, for example, a light-transmitting conductive material such as ITO or indium zinc oxide (IZO).

The sealing film 28 is provided on the upper electrode 24. An inorganic insulating film such as a silicon nitride film or an aluminum oxide film or a resin film such as an acrylic film is used as the sealing film 28. The sealing film 28 is not limited to a single layer, but may be a multilayered film having two or more layers obtained by combining the inorganic film with the resin film mentioned above. The sealing film 28 well seals the photodiodes 30, and thus can restrain water from entering the photodiodes 30 from the upper surface side thereof.

The configuration of the photodiode 30 illustrated in FIGS. 6 and 7 is merely exemplary and can be changed as appropriate. For example, the upper electrode 24 may be the anode electrode of the photodiode 30, and the lower electrode 23 may be the cathode electrode of the photodiode 30. Although the OPD using the organic semiconductor has been described as the photodiode 30 with reference to FIGS. 6 and 7, the photodiode 30 is not limited thereto, but may be a diode using an inorganic semiconductor, such as a PIN photodiode.

Figure 8:
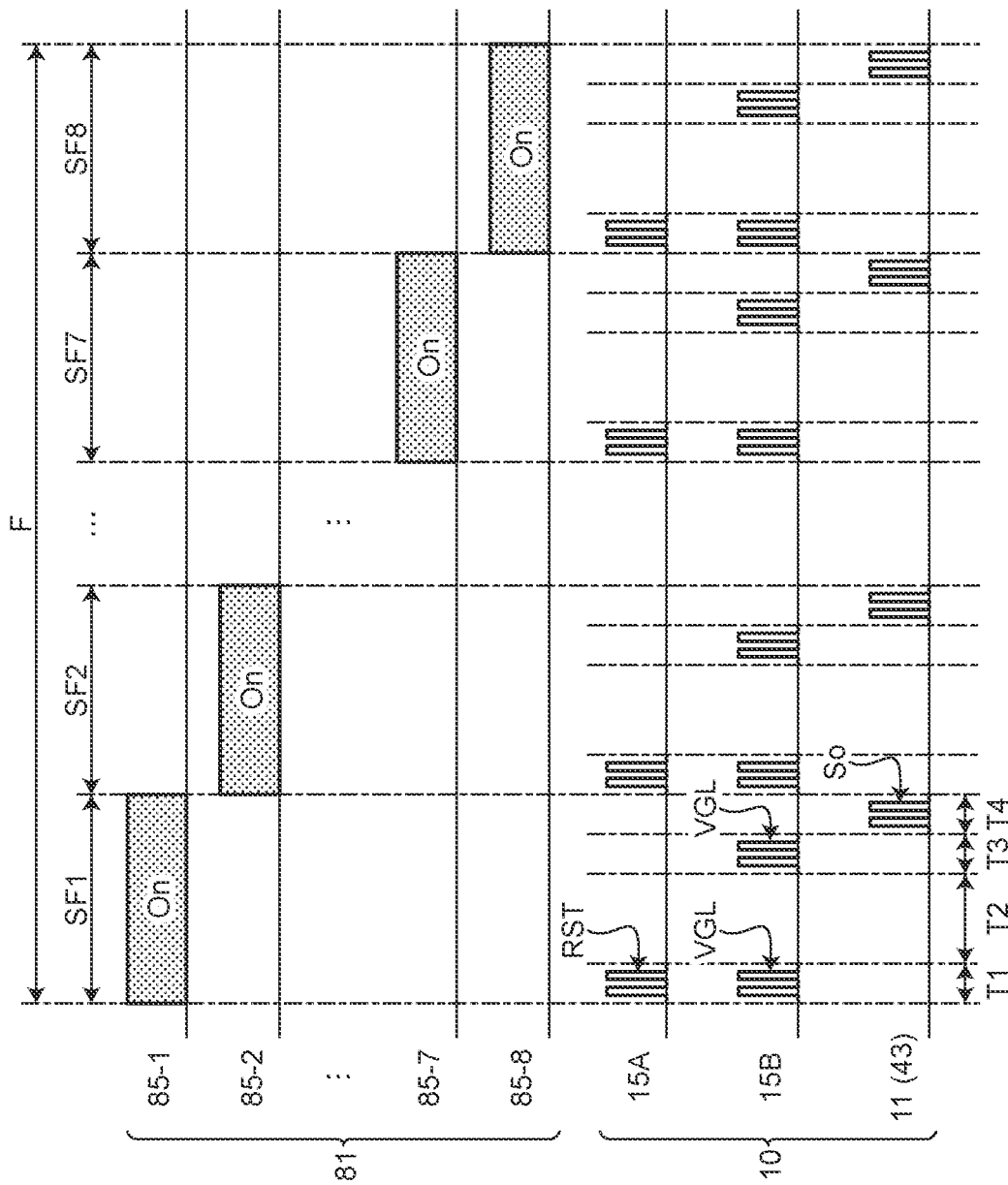
FIG. 8 is an explanatory chart schematically illustrating a lighting pattern of a plurality of light-emitting elements and a detection operation example of the optical sensor in the detection device according to the first embodiment.
Figure 9:
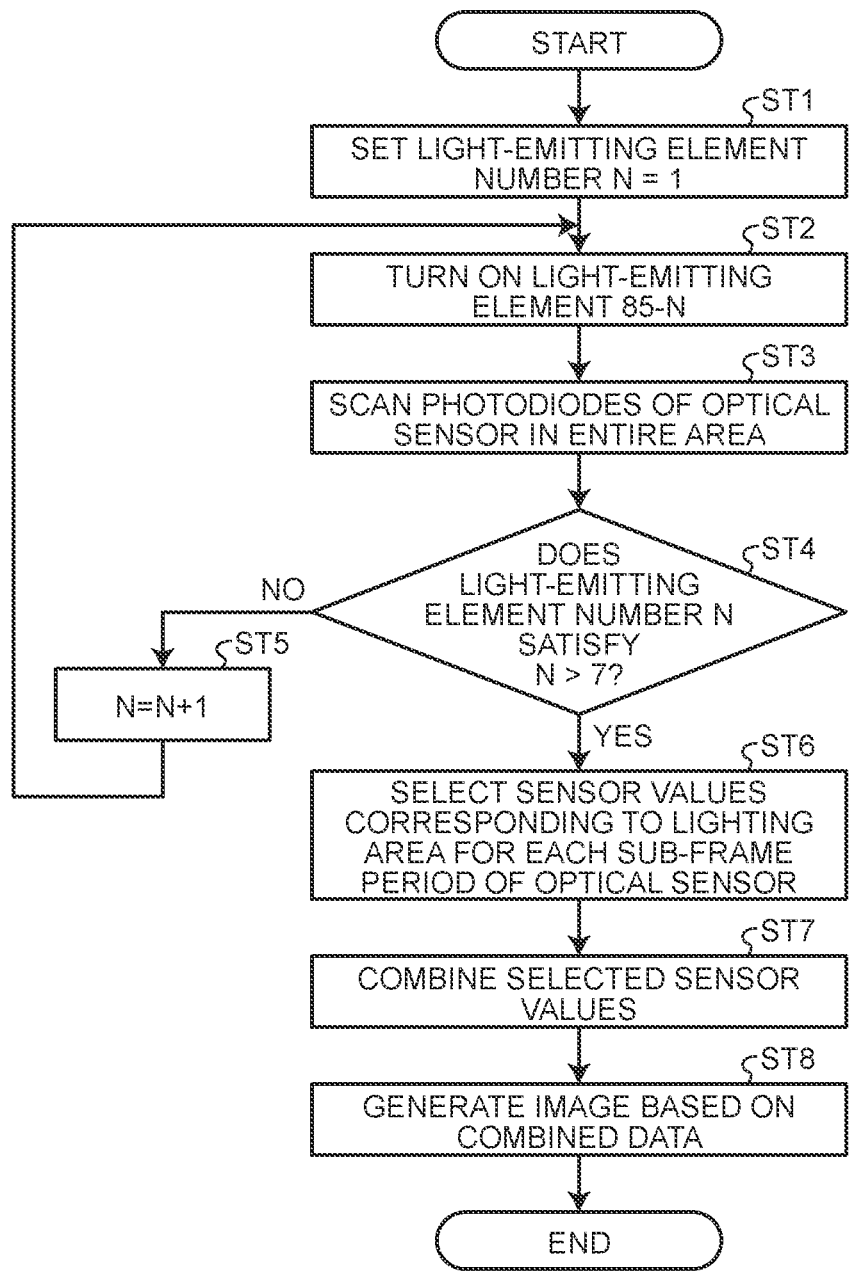
FIG. 9 is a flowchart illustrating the detection operation example of the detection device according to the first embodiment.
Figure 10:
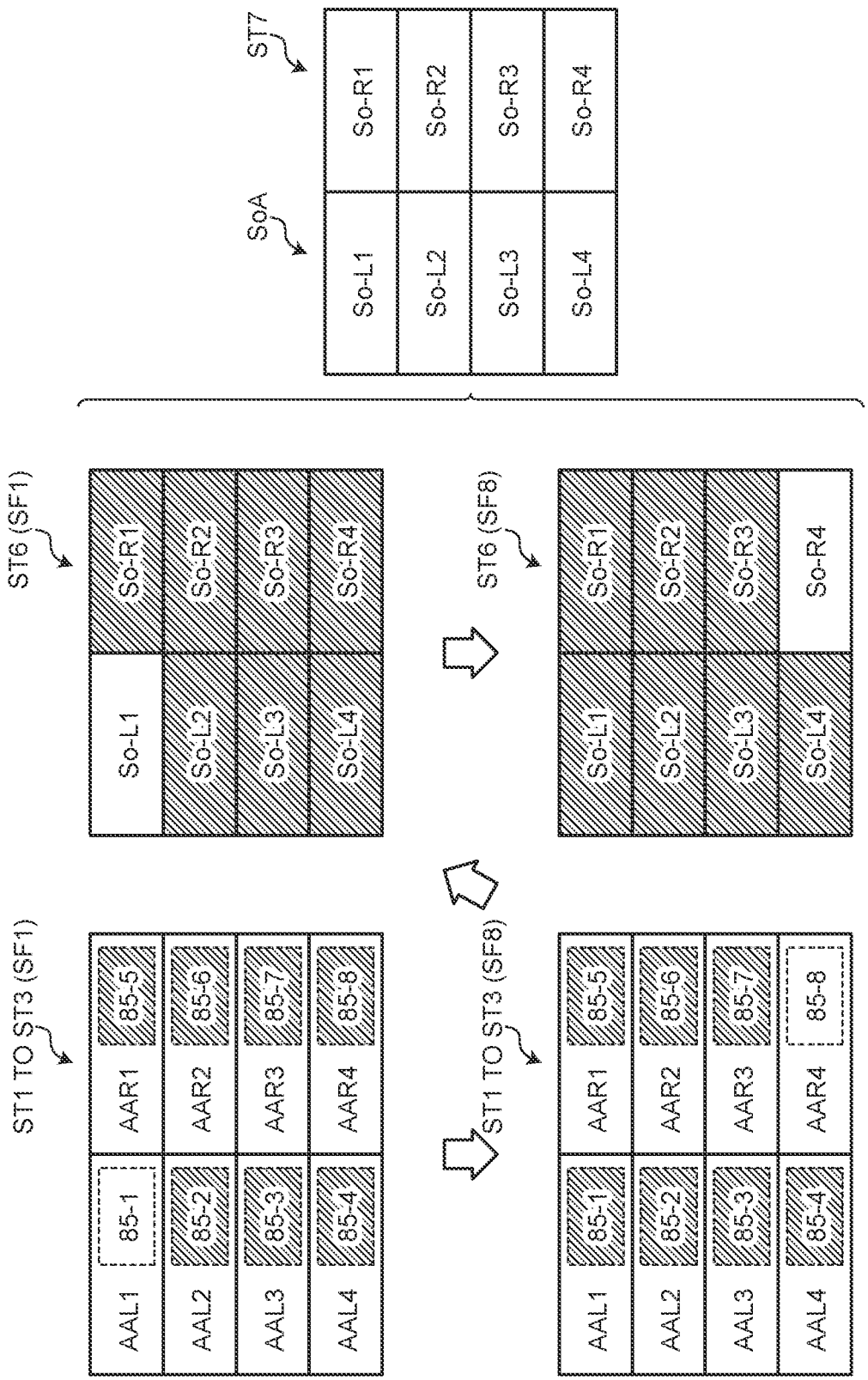
FIG. 10 is an explanatory diagram for explaining the detection operation example of the detection device according to the first embodiment.

The following describes a detection method of the detection device 1. FIG. 8 is an explanatory chart schematically illustrating a lighting pattern of the light-emitting elements and a detection operation example of the optical sensor in the detection device according to the first embodiment. FIG. 9 is a flowchart illustrating the detection operation example of the detection device according to the first embodiment. FIG. 10 is an explanatory diagram for explaining the detection operation example of the detection device according to the first embodiment.

As illustrated in FIG. 8, the detection device 1 divides one frame period F into the sub-frame periods SF, and controls the lighting and non-lighting of the light-emitting elements 85 and the detection of the photodiodes 30 for each of the sub-frame periods SF. The frame period F is, herein, a period of time required to acquire the sensor values So from the respective photodiodes 30 in the entire detection area AA. The sub-frame period SF is a period in which the sensor values So are acquired from the respective predetermined photodiodes 30 to be detected (detection blocks AAL and AAR).

In the light source device 81, the lighting pattern of the light-emitting elements 85 is switched for each of the sub-frame periods SF. The gate line drive circuits 15A and 15B and the detection control circuit 11 cause the optical sensor 10 to perform detection operations of a reset period T1, an exposure period T2, a read period T3, and a transmission period T4 for each of the sub-frame periods SF.

In the reset period T1, the gate line drive circuit 15A supplies the reset control signals RST to the reset transistors TrR, and the gate line drive circuit 15B sequentially supplies the gate drive signals VGL to the gate lines GL. This operation resets the photodiodes 30 in the detection area AA.

In the exposure period T2, a current corresponding to the amount of irradiating light flows through the photodiode 30, and thereby stores an electric charge in the capacitive element Ca. In the read period T3, the gate line drive circuit 15B sequentially supplies the gate drive signals VGL to the gate lines GL. This operation scans the photodiodes 30 to be detected in the detection area AA, and the photodiodes 30 to be detected that are selected based on the gate drive signals VGL output the detection signals Vdet. The detection signals Vdet are output to the detection control circuit 11 through the signal lines SL. As described with reference to FIG. 4, the detection control circuit 11 generates the sensor values So by processing the detection signals Vdet from the photodiodes 30.

In the transmission period T4, the signal processing circuit 43 of the detection control circuit 11 (refer to FIG. 4) transmits, to the host IC 70, the sensor values So obtained by the signal processing.

In more detail, as illustrated in FIG. 9, the lighting pattern generation circuit 75 of the host IC 70 (refer to FIG. 3) sets a light-emitting element number N to 1 (Step ST1). In the present embodiment, the light-emitting element number N is a natural number from 1 to 8 and is assigned correspondingly to each of the light-emitting elements 85-1 to 85-8.

The light source device 81 turns on the Nth (=1st) light-emitting element 85-N based on the control signal from the lighting pattern generation circuit 75 (Step ST2). The light source device 81 does not turn on (turns off) the light-emitting elements 85 other than the light-emitting element 85-N. Specifically, in a sub-frame period SF1, the light source device 81 causes the light-emitting element 85-1 to be lit and causes the light-emitting elements 85-2 to 85-8 to be unlit.

The optical sensor 10 scans the photodiodes 30 in the entire detection area AA (Step ST3). Specifically, in the sub-frame period SF1, operations of the reset period T1, the exposure period T2, the read period T3, and the transmission period T4 are executed. In the read period T3, the gate line drive circuit 15B sequentially scans the gate lines GL from the first row to the last row. Through this operation, the sensor values So are transmitted from the photodiodes 30 in the entire detection area AA to the host IC 70.

The lighting pattern generation circuit 75 determines whether the light-emitting element number N satisfies N>7 (Step ST4). If the light-emitting element number N does not satisfy N>7 (No at Step ST4), the lighting pattern generation circuit 75 updates the light-emitting element number N by incrementing N by one (Step ST5). Then, the detection device 1 repeats the processing at Steps ST2 and ST3 until the light-emitting element number N satisfies N>7.

That is, as illustrated in FIG. 8, in a sub-frame period SF2, the light source device 81 turns on the light-emitting element 85-2, and does not turn on (turns off) the light-emitting element 85-1 and the light-emitting elements 85-3 to 85-8. In the sub-frame period SF2, the photodiodes 30 in the entire detection area AA are scanned, and the sensor values So are transmitted to the host IC 70, in the same manner as in the sub-frame period SF1. In the sub-frame periods SF3 to SF6, the light-emitting elements 85-3 to 85-6 are sequentially lit. In each of the sub-frame periods SF3 to SF6, the photodiodes 30 in the entire detection area AA are scanned.

In a sub-frame period SF7, the light source device 81 turns on the light-emitting element 85-7, and does not turn on (turns off) the light-emitting elements 85-1 to 85-6 and the light-emitting element 85-8. In a sub-frame period SF8, the light source device 81 turns on the light-emitting element 85-8 and does not turn on (turns off) the light-emitting elements 85-1 to 85-7. Thus, the light source device 81 changes the position of the light-emitting element 85 that is lit for each of the sub-frame periods SF.

The optical sensor 10 scans the photodiodes 30 in the entire detection area AA in each of the sub-frame periods SF7 and SF8.

Diagrams in the left-hand part of FIG. 10 indicate that the photodiodes 30 in the detection blocks AAL and AAR are scanned if the detection blocks AAL and AAR are illustrated in white. The diagrams indicate that the photodiodes 30 in the detection blocks AAL and AAR are not scanned if the detection blocks AAL and AAR are hatched (refer to FIG. 14, for example). In the same manner, the diagrams indicate that the light-emitting elements 85 are lit if the light-emitting elements 85-1 to 85-8 are illustrated in white. The diagrams indicate that the light-emitting elements 85 are unlit if the light-emitting elements 85-1 to 85-8 are hatched.

As illustrated in FIG. 10, the photodiodes 30 in the entire detection blocks AAL and AAR are scanned in each of the sub-frame periods SF, and the position of the light-emitting element 85 that is lit for each of the sub-frame periods SF is sequentially changed. For example, the light-emitting element 85-1 is lit in the sub-frame period SF1. Light from the light-emitting element 85-1 irradiates the photodiodes 30 in the detection block AAL1 corresponding to the light-emitting element 85-1.

In other words, the photodiodes 30 in the detection block AAL1 corresponding to the lit-up light-emitting element 85-1 are the photodiodes 30 to be detected, and the photodiodes 30 in the detection blocks AAL and AAR corresponding to the unlit light-emitting elements 85-2 to 85-8 are the photodiodes 30 not to be detected.

Subsequently, the lighting pattern of the light-emitting elements 85 is sequentially changed, and the light-emitting element 85-2 is lit in the sub-frame period SF2. Light from the light-emitting element 85-2 irradiates the photodiodes 30 in the detection block AAL2 corresponding to the light-emitting element 85-2. In the sub-frame period SF8, the light-emitting element 85-8 is lit. Light from the light-emitting element 85-8 irradiates the photodiodes 30 in the detection block AAR4 corresponding to the light-emitting element 85-8.

In the present embodiment, in each of the sub-frame periods SF, the light-emitting elements 85 (for example, the light-emitting elements 85-2 and 85-5) adjacent to the lit-up light-emitting element 85 (for example, the light-emitting element 85-1) at least in the row and column directions are unlit. The photodiodes 30 to be detected in the detection blocks AAL and AAR are sequentially changed for each of the sub-frame periods SF in accordance with the lit-up light-emitting element 85. In the present embodiment, the entire detection area AA including the photodiodes 30 to be detected and the photodiodes 30 not to be detected are scanned for each of the sub-frame periods SF.

Referring back to FIG. 9, if the light-emitting element number N satisfies N>7 (Yes at Step ST4), that is, if the lighting of all the light-emitting elements 85 has been completed for the respective sub-frame periods SF, the sensor value selection circuit 73 of the host IC 70 selects the sensor values So of the detection blocks AAL and AAR corresponding to the lighting areas for the respective sub-frame periods SF (Step ST6).

Specifically, diagrams in the central part of FIG. 10 (Step ST6) schematically illustrate the sensor values So transmitted from the photodiodes 30 for each of the detection blocks AAL and AAR. For example, sensor values So-L1 indicate the sensor values So-L1 transmitted from the photodiodes 30 in the detection block AAL1. Sensor values So-R1 indicate the sensor values So-R1 transmitted from the photodiodes 30 in the detection block AAR1. In FIG. 10, the sensor values So selected by the sensor value selection circuit 73 in each of the sub-frame periods SF (the sub-frame periods SF1 and SF8 are illustrated in FIG. 10) are displayed in white. The non-selected sensor values So are displayed with hatching.

For example, in the sub-frame period SF1, the sensor value selection circuit 73 selects the sensor values So-L1 from the photodiodes 30 in the detection block AAL1 corresponding to the lit-up light-emitting element 85-1. The sensor value selection circuit 73 does not select sensor values So-L2, So-L3, So-L4, So-R1, So-R2, So-R3, and So-R4 from the photodiodes 30 in the detection blocks AAL and AAR corresponding to the unlit light-emitting elements 85-2 to 85-8.

Subsequently, the sensor values So to be selected are changed for each of the sub-frame periods SF, and, for example, in the sub-frame period SF8, the sensor value selection circuit 73 selects the sensor values So-R4 from the photodiodes 30 in the detection block AAR4 corresponding to the lit-up light-emitting element 85-8. The sensor value selection circuit 73 does not select the sensor values So-L1, So-L2, So-L3, So-L4, So-R1, So-R2, and So-R3 from the photodiodes 30 in the detection blocks AAL and AAR corresponding to the unlit light-emitting elements 85-1 to 85-7.

Referring back to FIG. 9, the combined data generation circuit 74 (refer to FIG. 3) combines the sensor values So selected at Step ST6 (Step ST7). The diagram in the right-hand part of FIG. 10 (Step ST7) schematically illustrates a configuration of the combined data SoA generated by the combined data generation circuit 74. The combined data SoA illustrated in the diagram in the right-hand part of FIG. 10 is made up of the sensor values So-L1, So-L2, So-L3, So-L4, So-R1, So-R2, So-R3, and So-R4.

The sensor values So-L1, So-L2, So-L3, So-L4, So-R1, So-R2, So-R3, and So-R4 of the combined data SoA are selected from the sensor values So acquired in the different sub-frame periods SF. Specifically, the sensor values So-L1 are the sensor values So-L1 output from the photodiodes 30 in the detection block AAL1 that are selected from the sensor values So in the sub-frame period SF1.

In the same manner, the sensor values So-L2 are the sensor values So-L2 output from the photodiodes 30 in the detection block AAL2 that are selected from the sensor values So in the sub-frame period SF2. The sensor values So-R4 are the sensor values So-R4 output from the photodiodes 30 in the detection block AAR4 that are selected from the sensor values So in the sub-frame period SF8.

Referring back to FIG. 9, the image generation circuit 77 (refer to FIG. 3) generates the image based on the combined data SoA (Step ST8).

As described above, the detection device 1 of the present embodiment includes the photodiodes 30 that are provided on the substrate 21, the light-emitting elements 85 that are arranged so as to face the photodiodes 30, and the light-transmitting placement substrate 101 that is disposed between the photodiodes 30 and the light-emitting elements 85 and on which the target objects 100 are to be placed. The photodiodes, the placement substrate, and the light-emitting elements are arranged in this order in a direction orthogonal to the substrate. Among the light-emitting elements 85, the light-emitting element 85 corresponding to the photodiodes 30 to be detected (for example, the light-emitting element 85-1) is lit, and the other light-emitting elements 85 corresponding to the photodiodes 30 not to be detected (for example, the light-emitting elements 85-2 to 85-8) are unlit. The photodiodes 30 to be detected output the sensor values based on the light from the lit-up light-emitting element 85. In each of the sub-frame periods SF, the light-emitting elements 85 adjacent to the lit-up light-emitting element 85 (for example, the light-emitting element 85-1) at least in the row and column directions (for example, the light-emitting elements 85-2 and 85-5) are unlit.

In the detection device 1, the photodiodes 30 to be detected (for example, the photodiodes 30 in the detection block AAL) and the light-emitting element 85 corresponding to the photodiodes 30 to be detected (for example, the light-emitting element 85-1) are arranged so as to overlap each other in plan view.

With this arrangement, as illustrated in FIG. 2, the light emitted from the lit-up light-emitting element 85 (for example, the light-emitting element 85-1) irradiates the target object 100 overlapping the lit-up light-emitting element 85, and enters the photodiodes 30 to be detected (for example, the detection block AAL1) that overlap the lit-up light-emitting element 85. In the present embodiment, the light-emitting elements 85 adjacent to the lit-up light-emitting element 85 in the row and column directions (for example, the light-emitting elements 85-2 and 85-5) are unlit. Therefore, the target object 100 and the photodiodes 30 to be detected are not irradiated with oblique light from the adjacent light-emitting elements 85 (for example, the light-emitting elements 85-2 and 85-5). As a result, the detection device 1 can restrain light from unintended directions from irradiating the photodiodes 30 to be detected, and thus can improve the detection accuracy of the detected sensor values So. This reduces blurring in the image generated based on the sensor values So.

Obliquely traveling components of the light from the lit-up light-emitting element 85 (for example, the light-emitting element 85-1) may also irradiate another of the target objects 100 that does not overlap the lit-up light-emitting element 85, and may also enter the photodiodes 30 not to be detected (for example, the detection blocks AAL2 to AAR4). In the present embodiment, the host IC 70 selects the sensor values So from the photodiodes 30 to be detected for each of the sub-frame periods SF. That is, the sensor values So from the photodiodes 30 to be detected that overlap the lit-up light-emitting element 85 are used to generate the image.

The host IC 70 does not select the sensor values So from the photodiodes 30 not to be detected. That is, the sensor values So from the photodiodes 30 not to be detected that do not overlap the lit-up light-emitting elements 85 are not used to generate the image. As a result, in the detection device 1, the sensor values So output from the photodiodes 30 based on the light emitted from unintended directions are not used to generate the image, and the image is generated using the combined data SoA generated only from the sensor values So from the photodiodes 30 to be detected.

The detection method illustrated in FIGS. 8 to 10 is merely exemplary and can be changed as appropriate. For example, the order of lighting of the light-emitting elements 85 for the sub-frame periods SF can be changed as appropriate. In FIGS. 8 to 10, one of the light-emitting elements 85 is lit for each of the sub-frame periods SF, but the lighting pattern is not limited to this pattern. More than one of the light-emitting elements 85 may be provided as one group, and the light-emitting elements 85 may be lit on a group-by-group basis. The photodiodes 30 and the light-emitting elements 85 are not limited to the configuration of being arranged in the first and the second columns, but may be arranged in at least one column. In that case, the light-emitting elements 85 arranged in the one column may be sequentially lit, and the photodiodes 30 arranged in the one column may sequentially output the sensor values So.

Second Embodiment

Figure 11:
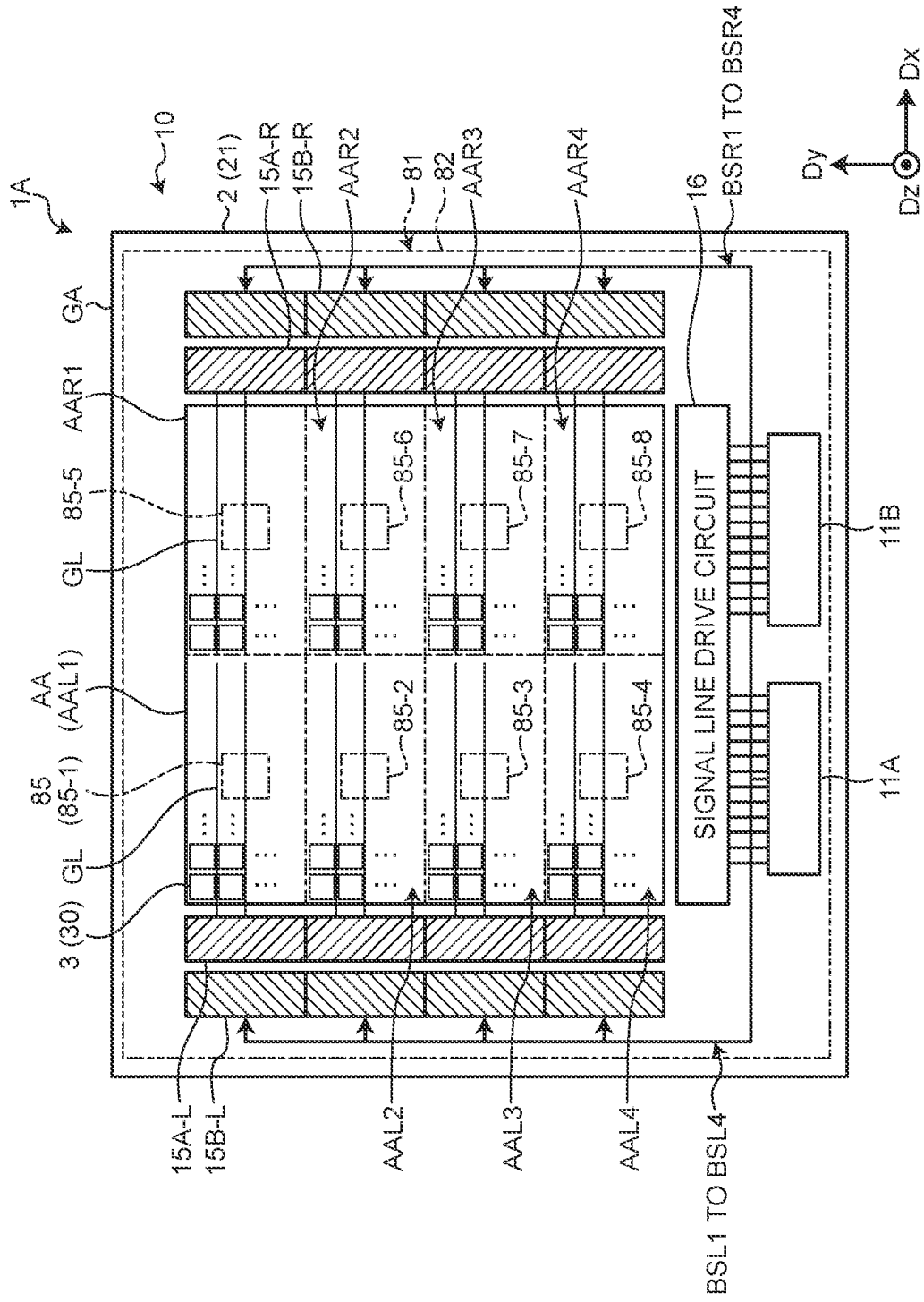
FIG. 11 is a plan view schematically illustrating a detection device according to a second embodiment.

FIG. 11 is a plan view schematically illustrating a detection device according to a second embodiment. In the following description, the same components as those described in the embodiment described above are denoted by the same reference numerals, and the description thereof will not be repeated.

As illustrated in FIG. 11, a detection device 1A according to the second embodiment includes gate line drive circuits 15A-L, 15A-R, 15B-L, and 15B-R, and detection control circuits 11A and 11B. The gate line drive circuits 15A-L and 15B-L are provided for the left-side detection blocks AAL. The gate line drive circuits 15A-L and 15B-L use the photodiodes 30 in the left-side detection block AAL to perform the detection operation in the reset period T1, the exposure period T2, and the read period T3 (refer to FIG. 12).

The gate line drive circuits 15A-R and 15B-R are provided for the right-side detection blocks AAR. The gate line drive circuits 15A-R and 15B-R use the photodiodes 30 in the right-side detection block AAR to perform the detection operation in the reset period T1, the exposure period T2, and the read period T3 (refer to FIG. 12).

The gate line drive circuits 15A-L, 15A-R, 15B-L, and 15B-R operate based on block selection signals BSL and BSR supplied from the detection control circuit 11A. In more detail, based on block selection signals BSL and BSR, the gate line drive circuits 15A-L, 15A-R, 15B-L, and 15B-R scan the photodiodes 30 corresponding to some of the detection blocks AAL and AAR (photodiodes 30 to be detected), and does not scan the photodiodes 30 corresponding to the others of the detection blocks AAL and AAR (photodiodes 30 not to be detected).

The detection control circuit 11A receives the detection signals Vdet of the photodiodes 30 in the left-side detection block AAL and performs predetermined signal processing. The detection control circuit 11B receives the detection signals Vdet of the photodiodes 30 in the right-side detection block AAR and performs the predetermined signal processing. The detection control circuits 11A and 11B are synchronously controlled by the integrated control circuit 71 of the host IC 70.

The gate lines GL are provided so as to be separated between the left-side detection blocks AAL and the right-side detection blocks AAR. That is, the gate lines GL include the gate lines GL that are coupled to the photodiodes 30 arranged in the first column (first column gate lines GL) and the gate lines GL that are provided separately from the first column gate lines GL and coupled to the photodiodes 30 arranged in the second column (second column gate lines GL). The first column gate lines GL and the photodiodes 30 arranged in the first column are coupled to the gate line drive circuits 15A-L and 15B-L that are one of a pair of gate line drive circuits. The second column gate lines GL and the photodiodes 30 arranged in the second column are coupled to the gate line drive circuits 15A-R and 15B-R that are the other of the pair of gate line drive circuits.

The configuration described above allows the detection device 1A according to the second embodiment to drive the photodiodes 30 in the left-side detection block AAL and the photodiodes 30 in the right-side detection block AAR in a synchronous manner and in an independent manner between the detection blocks AAL and AAR.

Figure 12:
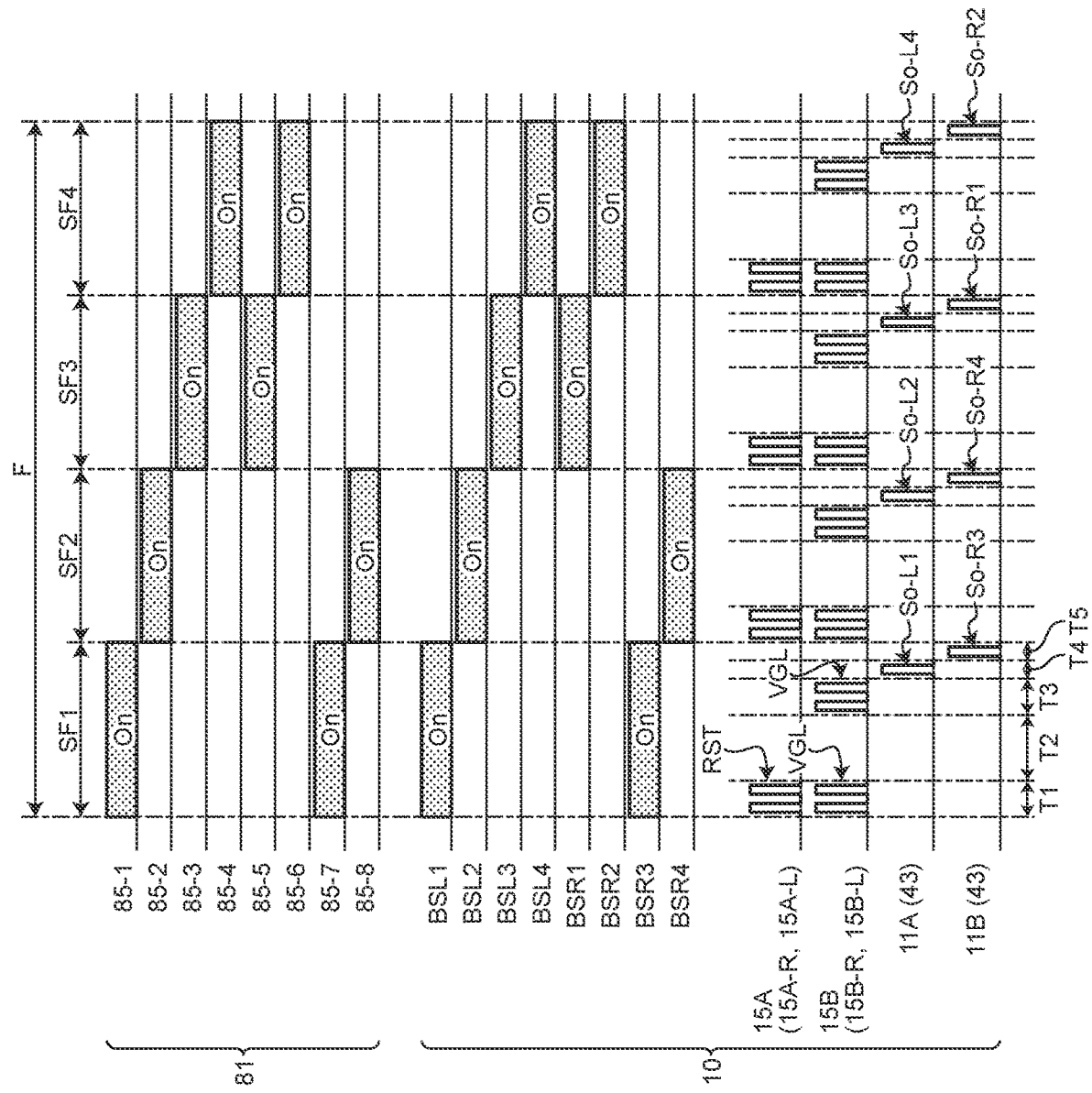
FIG. 12 is an explanatory chart schematically illustrating a lighting pattern of the light-emitting elements and a detection operation example of the optical sensor in the detection device according to the second embodiment.
Figure 13:
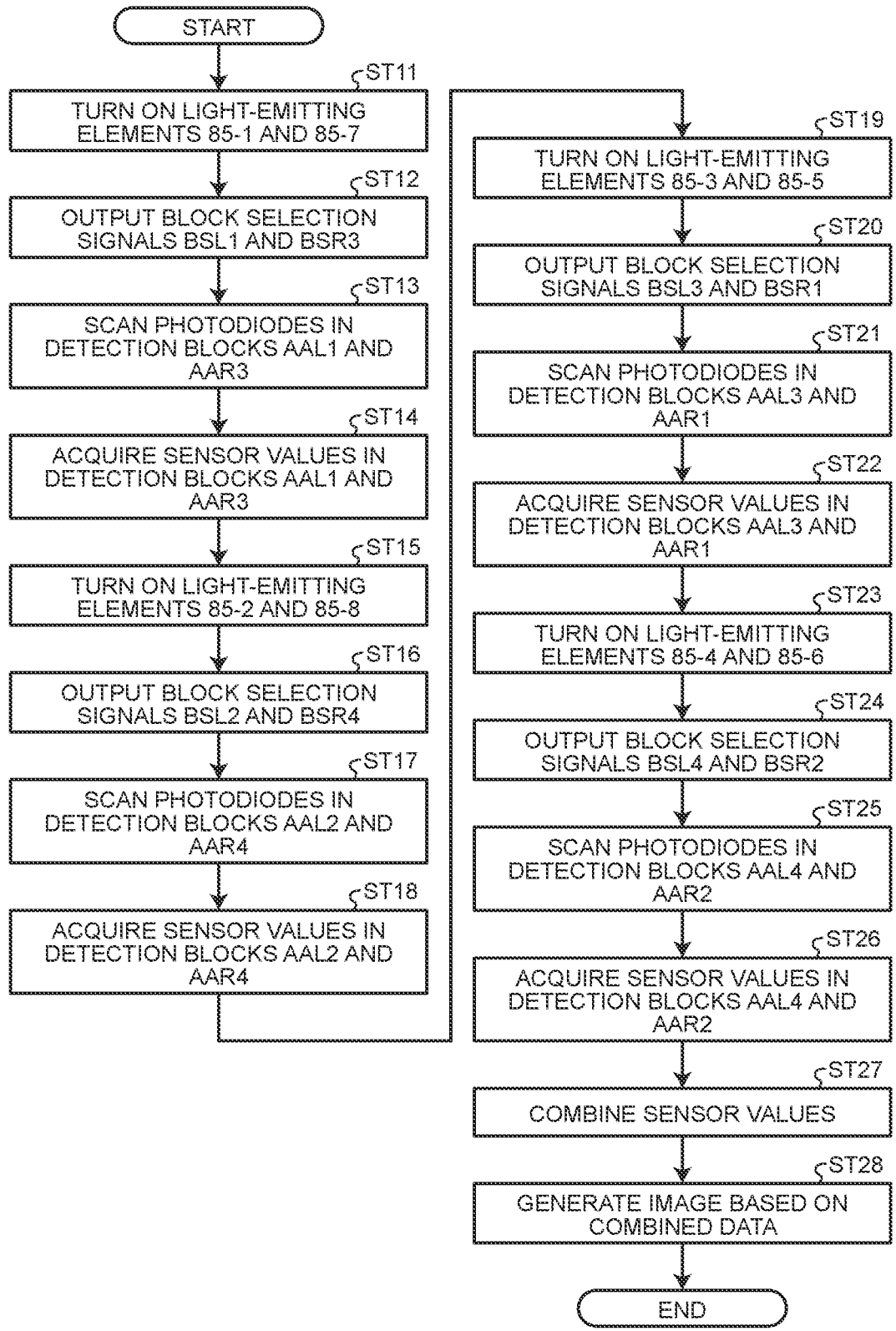
FIG. 13 is a flowchart illustrating the detection operation example of the detection device according to the second embodiment.
Figure 14:
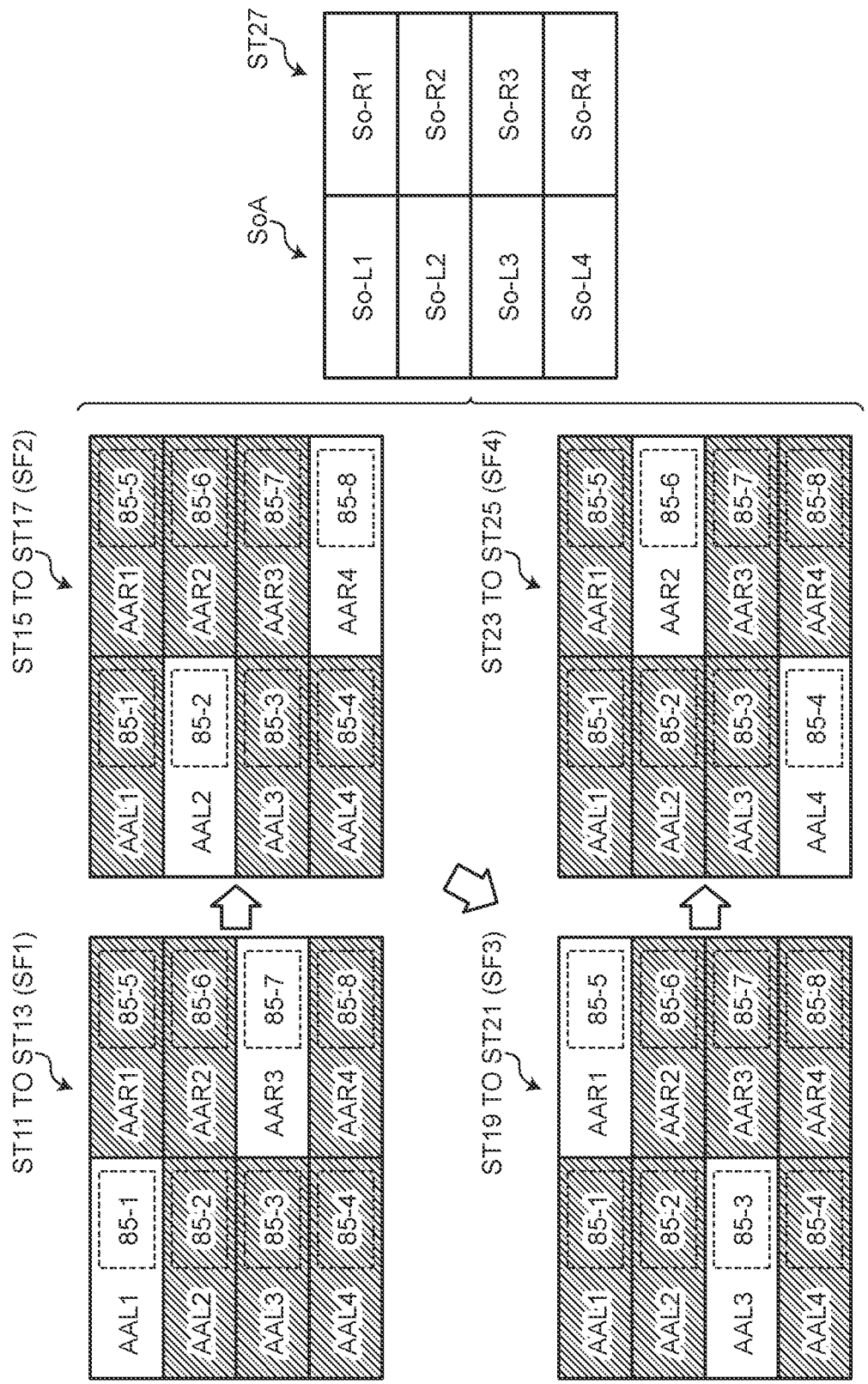
FIG. 14 is an explanatory diagram for explaining the detection operation example of the detection device according to the second embodiment.

FIG. 12 is an explanatory chart schematically illustrating a lighting pattern of the light-emitting elements and a detection operation example of the optical sensor in the detection device according to the second embodiment. FIG. 13 is a flowchart illustrating the detection operation example of the detection device according to the second embodiment. FIG. 14 is an explanatory diagram for explaining the detection operation example of the detection device according to the second embodiment.

As illustrated in FIGS. 12 and 13, the light source device 81 turns on the light-emitting elements 85-1 and 85-7 in the sub-frame period SF1 (Step ST11). In the sub-frame period SF1, the light source device 81 does not turn on (turns off) the light-emitting elements 85-2, 85-3, 85-4, 85-5, 85-6, and 85-8 other than the light-emitting elements 85-1 and 85-7.

As illustrated in FIG. 14, in the sub-frame period SF1, the light-emitting elements 85-2 and 85-5 that are adjacent to the lit-up light-emitting element 85-1 at least in the row and column directions are unlit. The light-emitting elements 85-3, 85-6, and 85-8 adjacent to the lit-up light-emitting element 85-7 at least in the row and column directions are unlit.

Then, as illustrated in FIGS. 12 and 13, the detection control circuit 11A outputs a block selection signal BSL1 to the gate line drive circuits 15A-L and 15B-L in the sub-frame period SF1. The detection control circuit 11A also outputs a block selection signal BSR3 to the gate line drive circuits 15A-R and 15B-R (Step ST12).

In the sub-frame period SF1, the optical sensor 10 scans the photodiodes 30 in the detection block AAL1 using the gate line drive circuits 15A-L and 15B-L. In the sub-frame period SF1, the optical sensor 10 also scans the photodiodes 30 in the detection block AAR3 using the gate line drive circuits 15A-R and 15B-R (Step ST13).

As illustrated in FIG. 14, in the sub-frame period SF1, the photodiodes 30 in the detection blocks AAL2, AAL3, AAL4, AAR1, AAR2, and AAR4 other than the detection blocks AAL1 and AAR3 are not scanned.

In other words, based on the block selection signals BSL1 and BSR3, the light-emitting elements 85-1 and 85-7 that overlap the photodiodes 30 in the detection blocks AAL1 and AAR3 selected as detection blocks to be detected are lit. The light-emitting elements 85-2, 85-3, 85-4, 85-5, 85-6, and 85-8 that overlap the photodiodes 30 in the detection blocks AAL2, AAL3, AAL4, AAR1, AAR2, and AAR4 not to be detected different from the detection blocks AAL1 and AAR3 are unlit. In the present embodiment, only the photodiodes 30 to be detected are scanned, and the photodiodes 30 not to be detected are not scanned.

Then, as illustrated in FIGS. 12 and 13, in the transmission period T4, the detection control circuit 11A outputs the sensor values So-L1 from the photodiodes 30 in the detection block AAL1 to the host IC 70. In a transmission period T5, the detection control circuit 11B outputs the sensor values So-R3 from the photodiodes 30 in the detection block AAR3 to the host IC 70. The host IC 70 acquires the sensor values So-L1 and So-R3 from the photodiodes 30 in the detection blocks AAL1 and AAR3 (Step ST14). The sensor value storage circuit 72 of the host IC 70 stores therein the sensor values So-L1 and So-R3 acquired in the sub-frame period SF1.

As illustrated in FIGS. 12 and 13, the light source device 81 turns on the light-emitting elements 85-2 and 85-8 in the sub-frame period SF2 (Step ST15). In the sub-frame period SF2, the light source device 81 does not turn on (turns off) the light-emitting elements 85-1, 85-3, 85-4, 85-5, 85-6, and 85-7 other than the light-emitting elements 85-2 and 85-8.

As illustrated in FIG. 14, in the sub-frame period SF2, the light-emitting elements 85-1, 85-3, and 85-6 that are adjacent to the lit-up light-emitting element 85-2 at least in the row and column directions are unlit. The light-emitting elements 85-4 and 85-7 adjacent to the lit-up light-emitting element 85-8 at least in the row and column directions are unlit.

Then, as illustrated in FIGS. 12 and 13, the detection control circuit 11A outputs a block selection signal BSL2 to the gate line drive circuits 15A-L and 15B-L in the sub-frame period SF2. The detection control circuit 11A also outputs a block selection signal BSR4 to the gate line drive circuits 15A-R and 15B-R (Step ST16).

In the sub-frame period SF2, the optical sensor 10 scans the photodiodes 30 in the detection block AAL2 using the gate line drive circuits 15A-L and 15B-L. In the sub-frame period SF2, the optical sensor 10 also scans the photodiodes 30 in the detection block AAR4 using the gate line drive circuits 15A-R and 15B-R (Step ST17).

As illustrated in FIG. 14, in the sub-frame period SF2, the photodiodes 30 in the detection blocks AAL1, AAL3, AAL4, AAR1, AAR2, and AAR3 other than the detection blocks AAL2 and AAR4 are not scanned.

In other words, based on the block selection signals BSL2 and BSR4, the light-emitting elements 85-2 and 85-8 that overlap the photodiodes 30 in the detection blocks AAL2 and AAR4 selected as detection blocks to be detected are lit. The light-emitting elements 85-1, 85-3, 85-4, 85-5, 85-6, and 85-7 that overlap the photodiodes 30 in the detection blocks AAL1, AAL3, AAL4, AAR1, AAR2, and AAR3 not to be detected different from the detection blocks AAL2 and AAR4 are unlit.

Then, as illustrated in FIGS. 12 and 13, in the transmission period T4, the detection control circuit 11A outputs the sensor values So-L2 from the photodiodes 30 in the detection block AAL2 to the host IC 70. In the transmission period T5, the detection control circuit 11B outputs the sensor values So-R4 from the photodiodes 30 in the detection block AAR4 to the host IC 70. The host IC 70 acquires the sensor values So-L2 and So-R4 from the photodiodes 30 in the detection blocks AAL2 and AAR4 (Step ST18). The sensor value storage circuit 72 of the host IC 70 stores therein the sensor values So-L2 and So-R4 acquired in the sub-frame period SF2.

As illustrated in FIGS. 12 and 13, the light source device 81 turns on the light-emitting elements 85-3 and 85-5 in the sub-frame period SF3 (Step ST19). In the sub-frame period SF3, the light source device 81 does not turn on (turns off) the light-emitting elements 85-1, 85-2, 85-4, 85-6, 85-7, and 85-8 other than the light-emitting elements 85-3 and 85-5.

As illustrated in FIG. 14, in the sub-frame period SF3, the light-emitting elements 85-2, 85-4, and 85-7 that are adjacent to the lit-up light-emitting element 85-3 at least in the row and column directions are unlit. The light-emitting elements 85-1 and 85-6 adjacent to the lit-up light-emitting element 85-5 at least in the row and column directions are unlit.

Then, as illustrated in FIGS. 12 and 13, the detection control circuit 11A outputs a block selection signal BSL3 to the gate line drive circuits 15A-L and 15B-L in the sub-frame period SF3. The detection control circuit 11A also outputs a block selection signal BSR1 to the gate line drive circuits 15A-R and 15B-R (Step ST20).

In the sub-frame period SF3, the optical sensor 10 scans the photodiodes 30 in the detection block AAL3 using the gate line drive circuits 15A-L and 15B-L. In the sub-frame period SF3, the optical sensor 10 also scans the photodiodes 30 in the detection block AAR1 using the gate line drive circuits 15A-R and 15B-R (Step ST21).

As illustrated in FIG. 14, in the sub-frame period SF3, the photodiodes 30 in the detection blocks AAL1, AAL2, AAL4, AAR2, AAR3, and AAR4 other than the detection blocks AAL3 and AAR1 are not scanned.

In other words, based on the block selection signals BSL3 and BSR1, the light-emitting elements 85-3 and 85-5 that overlap the photodiodes 30 in the detection blocks AAL3 and AAR1 selected as detection blocks to be detected are lit. The light-emitting elements 85-1, 85-2, 85-4, 85-6, 85-7, and 85-8 that overlap the photodiodes 30 in the detection blocks AAL1, AAL2, AAL4, AAR2, AAR3, and AAR4 not to be detected different from the detection blocks AAL5 and AAR1 are unlit.

Then, as illustrated in FIGS. 12 and 13, in the transmission period T4, the detection control circuit 11A outputs the sensor values So-L3 from the photodiodes 30 in the detection block AAL3 to the host IC 70. In the transmission period T5, the detection control circuit 11B outputs the sensor values So-R1 from the photodiodes 30 in the detection block AAR1 to the host IC 70. The host IC 70 acquires the sensor values So-L3 and So-R1 from the photodiodes 30 in the detection blocks AAL3 and AAR1 (Step ST22). The sensor value storage circuit 72 of the host IC 70 stores therein the sensor values So-L3 and So-R1 acquired in the sub-frame period SF3.

As illustrated in FIGS. 12 and 13, the light source device 81 turns on the light-emitting elements 85-4 and 85-6 in the sub-frame period SF4 (Step ST23). In the sub-frame period SF4, the light source device 81 does not turn on (turns off) the light-emitting elements 85-1, 85-2, 85-3, 85-5, 85-7, and 85-8 other than the light-emitting elements 85-4 and 85-6.

As illustrated in FIG. 14, in the sub-frame period SF4, the light-emitting elements 85-3 and 85-8 that are adjacent to the lit-up light-emitting element 85-4 at least in the row and column directions are unlit. The light-emitting elements 85-2, 85-5, and 85-7 adjacent to the lit-up light-emitting element 85-6 at least in the row and column directions are unlit.

Then, as illustrated in FIGS. 12 and 13, the detection control circuit 11A outputs a block selection signal BSL4 to the gate line drive circuits 15A-L and 15B-L in the sub-frame period SF4. The detection control circuit 11A also outputs a block selection signal BSR2 to the gate line drive circuits 15A-R and 15B-R (Step ST24).

In the sub-frame period SF4, the optical sensor 10 scans the photodiodes 30 in the detection block AAL4 using the gate line drive circuits 15A-L and 15B-L. In the sub-frame period SF4, the optical sensor 10 also scans the photodiodes 30 in the detection block AAR2 using the gate line drive circuits 15A-R and 15B-R (Step ST25).

As illustrated in FIG. 14, in the sub-frame period SF4, the photodiodes 30 in the detection blocks AAL1, AAL2, AAL3, AAR1, AAR3, and AAR4 other than the detection blocks AAL4 and AAR2 are not scanned.

In other words, based on the block selection signals BSL4 and BSR2, the light-emitting elements 85-4 and 85-6 that overlap the photodiodes 30 in the detection blocks AAL4 and AAR2 selected as detection blocks to be detected are lit. The light-emitting elements 85-1, 85-2, 85-3, 85-5, 85-7, and 85-8 that overlap the photodiodes 30 in the detection blocks AAL1, AAL2, AAL3, AAR1, AAR3, and AAR4 not to be detected different from the detection blocks AAL4 and AAR2 are unlit.

Then, as illustrated in FIGS. 12 and 13, in the transmission period T4, the detection control circuit 11A outputs the sensor values So-L4 from the photodiodes 30 in the detection block AAL4 to the host IC 70. In the transmission period T5, the detection control circuit 11B outputs the sensor values So-R2 from the photodiodes 30 in the detection block AAR2 to the host IC 70. The host IC 70 acquires the sensor values So-L4 and So-R2 from the photodiodes 30 in the detection blocks AAL4 and AAR2 (Step ST26). The sensor value storage circuit 72 of the host IC 70 stores therein the sensor values So-L4 and So-R2 acquired in the sub-frame period SF4.

The combined data generation circuit 74 (refer to FIG. 3) combines the sensor values So acquired in the sub-frame periods SF1 to SF4 (Step ST27). As illustrated in the diagram in the right-hand part of FIG. 14 (Step ST27), the combined data SoA generated by the combined data generation circuit 74 is made up of the sensor values So-L1, So-L2, So-L3, So-L4, So-R1, So-R2, So-R3, and So-R4.

The sensor values So-L1, So-L2, So-L3, So-L4, So-R1, So-R2, So-R3, and So-R4 of the combined data SoA are selected from the sensor values So acquired in the different sub-frame periods SF. Specifically, the sensor values So-L1 and So-R3 are the sensor values acquired in the sub-frame period SF1. The sensor values So-L2 and So-R4 are the sensor values acquired in sub-frame period SF2. The sensor values So-L3 and So-R1 are the sensor values acquired in sub-frame period SF3. The sensor values So-L4 and So-R2 are the sensor values acquired in sub-frame period SF4.

As illustrated in FIG. 13, the image generation circuit 77 (refer to FIG. 3) generates the image based on the combined data SoA (Step ST28).

As described above, in the detection device 1A of the present embodiment, the sub-frame periods SF are provided that are obtained by dividing the frame period F of acquiring the sensor values So from the respective photodiodes 30 arranged in the detection area AA. The light-emitting elements 85 are sequentially lit up in the sub-frame periods SF, and the photodiodes 30 corresponding to the lit-up light-emitting elements 85 sequentially output the sensor values So for the sub-frame periods SF. The detection device 1A includes the image generation circuit 77 that generates one image by combining the sensor values So for the sub-frame periods SF based on the sensor values So output for each of the sub-frame periods SF and the position information on the photodiodes 30 in the detection area AA.

The light-emitting elements 85 that overlap the photodiodes 30 not to be detected that are adjacent to the photodiodes 30 to be detected are unlit.

With this method, only the photodiodes 30 to be detected corresponding to the lit-up light-emitting elements 85 are scanned, and the photodiodes 30 not to be detected are not scanned. The obliquely traveling components of the light from the lit-up light-emitting element 85 (for example, the light-emitting element 85-1) may irradiate the photodiodes 30 in another of the detection blocks AAL and AAR adjacent to the photodiodes 30 to be detected. Even in this case, the photodiodes 30 not to be detected are not scanned. Therefore, the output of the sensor values So based on the oblique light can be reduced. As a result, the detection device 1A of the present embodiment can improve the detection accuracy.

In the detection device 1A of the present embodiment, the photodiodes 30 and the light-emitting elements 85 are arranged in at least the first and the second columns. The light-emitting elements 85 (light-emitting elements 85-1, 85-2, 85-3, and 85-4) arranged in the first column are sequentially lit up, and the photodiodes 30 to be detected among the photodiodes 30 arranged in the first column sequentially output the sensor values. The light-emitting elements 85 (light-emitting elements 85-5, 85-6, 85-7, and 85-8) arranged in the second column are sequentially lit up, and the photodiodes 30 to be detected among the photodiodes 30 arranged in the second column sequentially output the sensor values. In a given sub-frame period SF, the row of the light-emitting elements 85 lit up in the first column differs from that of the light-emitting elements 85 lit up in the second column, and the row of the photodiodes 30 to be detected in the first column differs from that of the photodiodes 30 to be detected in the second column.

As a result, light from the light-emitting element 85 lit up in the first column can be restrained from irradiating the photodiodes 30 to be detected in the second column. In addition, light from the light-emitting element 85 lit up in the second column can be restrained from irradiating the photodiodes 30 to be detected in the first column.

More specifically, as illustrated in FIG. 14, the lighting pattern of the light-emitting elements 85 in each of the columns is set such that the distance between the lit-up light-emitting element 85 in the first column and the lit-up light-emitting element 85 in the second column is larger in any one of the sub-frame periods SF from the sub-frame period SF1 to the sub-frame period SF4. Alternatively, the photodiodes 30 to be detected in each of the columns (detection blocks AAL and AAR) are set such that the photodiodes 30 to be detected in the first column (detection block AAL) are not adjacent to the photodiodes 30 to be detected in the second column (detection block AAR) in any one of the row direction, the column direction, and oblique directions in any one of the sub-frame periods SF.

First Modification

Figure 15:
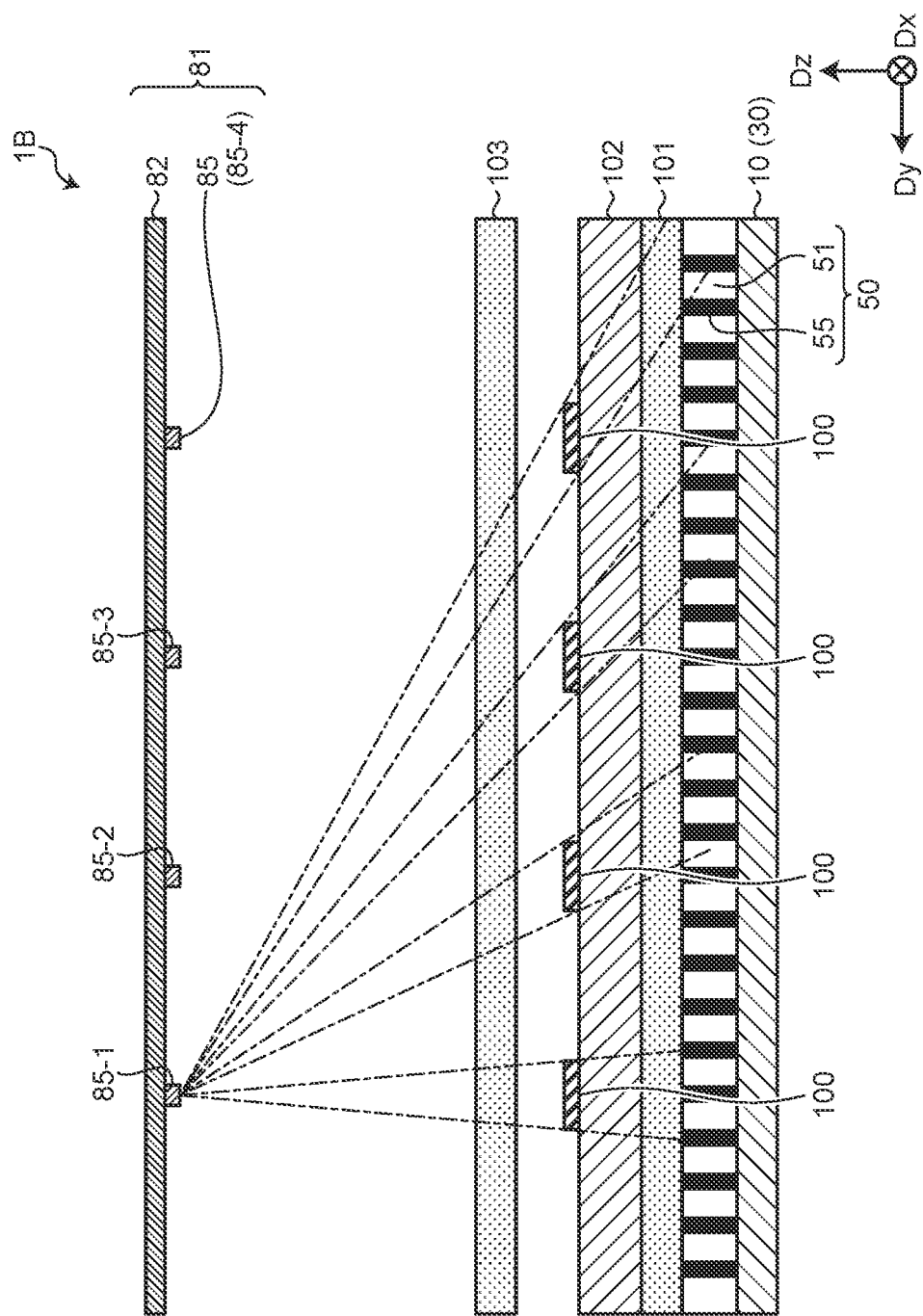
FIG. 15 is a sectional view schematically illustrating a detection device according to a first modification.

FIG. 15 is a sectional view schematically illustrating a detection device according to a first modification. As illustrated in FIG. 15, a detection device 1B according to the first modification includes an optical filter layer 50 provided between the photodiodes 30 of the optical sensor 10 and the placement substrate 101. The optical filter layer 50 is disposed so as to face the photodiodes 30 of the optical sensor 10.

The optical filter layer 50 has a plurality of light guide paths 51 and a light-blocking portion 55 provided around the light guide paths 51. At least some of the light guide paths 51 overlap the photodiodes 30. The light-blocking portion 55 has higher optical absorbance than that of the light guide paths 51. The optical filter layer 50 is an optical element that transmits a component of light emitted from the light-emitting elements 85 that travels in the third direction Dz toward the photodiodes 30. The optical filter layer 50 is also called collimating apertures or a collimator.

In the first modification, since the optical filter layer 50 is provided, obliquely traveling light of the light emitted from the light-emitting element 85 is blocked by the light-blocking portion 55. As a result, the photodiodes 30 not overlapping the lit-up light-emitting element 85 (photodiodes 30 not to be detected) can be restrained from being irradiated with unintended light.

The optical filter layer 50 may have any configuration as long as being capable of transmitting the component of the light emitted from the light-emitting elements 85 that travels in the third direction Dz. For example, the light guide paths 51 may be formed into columnar shapes or wall shapes (a louver shape) extending in a predetermined direction.

Second Modification

Figure 16:
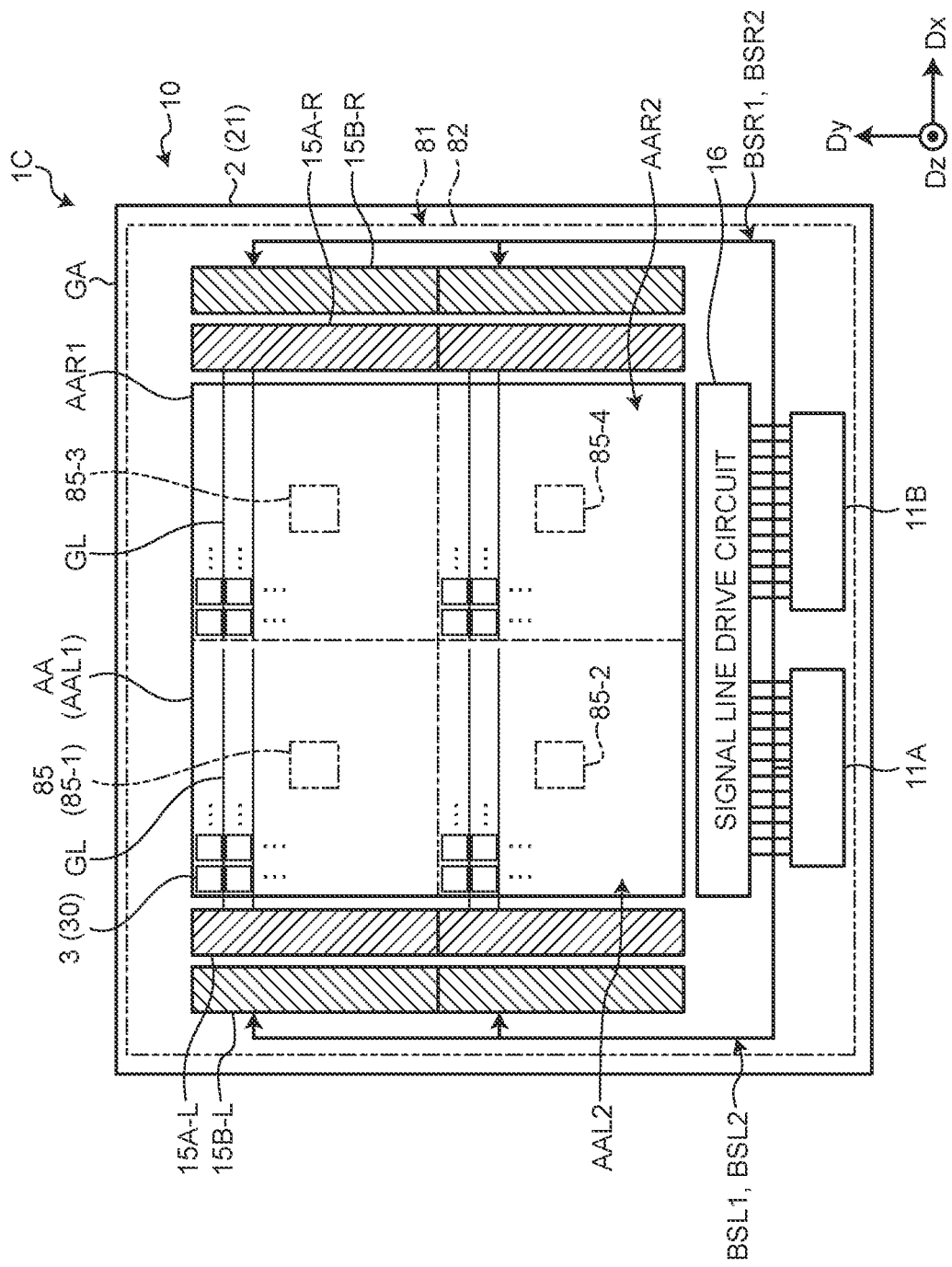
FIG. 16 is a plan view schematically illustrating a detection device according to a second modification.

FIG. 16 is a plan view schematically illustrating a detection device according to a second modification. In the first and the second embodiments described above, the examples have been described in which the eight light-emitting elements 85 are arranged in the first and the second columns, and the detection area AA is divided into the detection blocks AAL and AAR corresponding to the eight light-emitting elements 85. In the first and the second embodiments, the light-emitting elements 85 and the detection blocks AAL and AAR are arranged in four rows and two columns. However, the number and arrangement of the light-emitting elements 85 and the detection blocks AAL and AAR can be changed as appropriate.

As illustrated in FIG. 16, in a detection device 1C according to the second modification, the light source device 81 includes the four light-emitting elements 85-1, 85-2, 85-3, and 85-4. The optical sensor 10 includes the four detection blocks AAL1, AAL2, AAR1, and AAR2.

The light-emitting elements 85-1 and 85-2 among the light-emitting elements 85 are arranged in the second direction Dy (column direction). The light-emitting elements 85-3 and 85-4 are arranged in the second direction Dy (column direction) and are arranged adjacent to the right side (in the first direction Dx) of the light-emitting elements 85-1 and 85-2, respectively. In the second modification, the light-emitting elements 85-1 and 85-2 are the light-emitting elements 85 in the first row, and the light-emitting elements 85-3 and 85-4 are the light-emitting elements 85 in the second column.

The detection area AA of the optical sensor 10 is divided into the detection blocks AAL1, AAL2, AAR1, and AAR2 corresponding to the light-emitting elements 85-1, 85-2, 85-3, 85-4. The photodiodes 30 are arranged in a matrix in each of the detection blocks AAL1, AAL2, AAR1, and AAR2.

The detection blocks AAL1 and AAL2 are arranged in the second direction Dy (column direction). The detection blocks AAR1 and AAR2 are arranged in the second direction Dy (column direction) and are arranged adjacent to the right side (in the first direction Dx) of detection blocks AAL1 and AAL2, respectively.

The detection blocks AAL1 and AAL2 are arranged correspondingly to the light-emitting elements 85 arranged in the first column. The detection blocks AAR1 and AAR2 are arranged correspondingly to the light-emitting elements 85 arranged in the second column. In the second modification, the photodiodes 30 in the detection blocks AAL1 and AAL2 may be referred to as the photodiodes 30 arranged in the first column. The photodiodes 30 in the detection blocks AAR1 and AAR2 may be referred to as the photodiodes 30 arranged in the second column.

Figure 17:
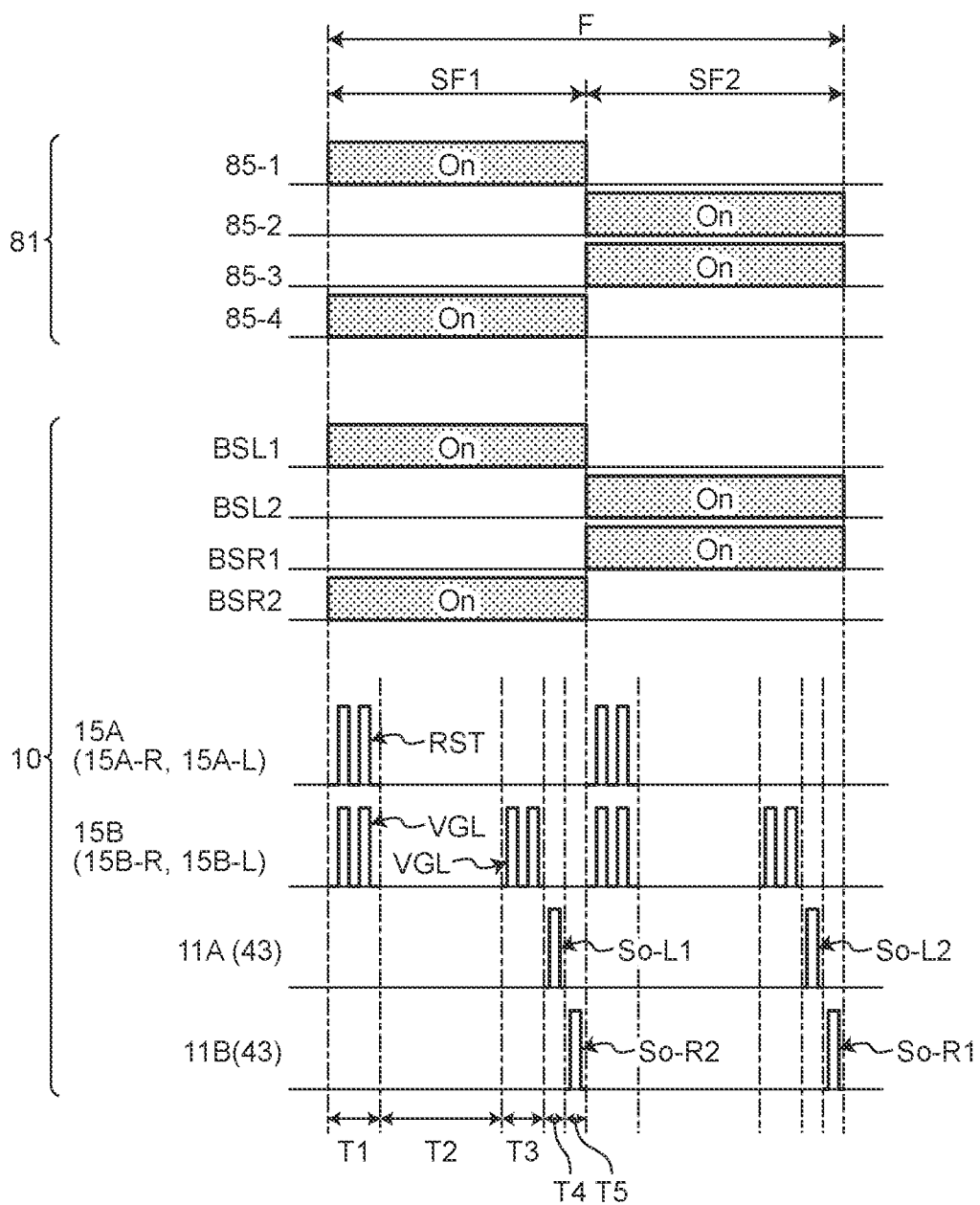
FIG. 17 is an explanatory chart schematically illustrating a lighting pattern of the light-emitting elements and a detection operation example of the optical sensor in the detection device according to the second modification.
Figure 18:
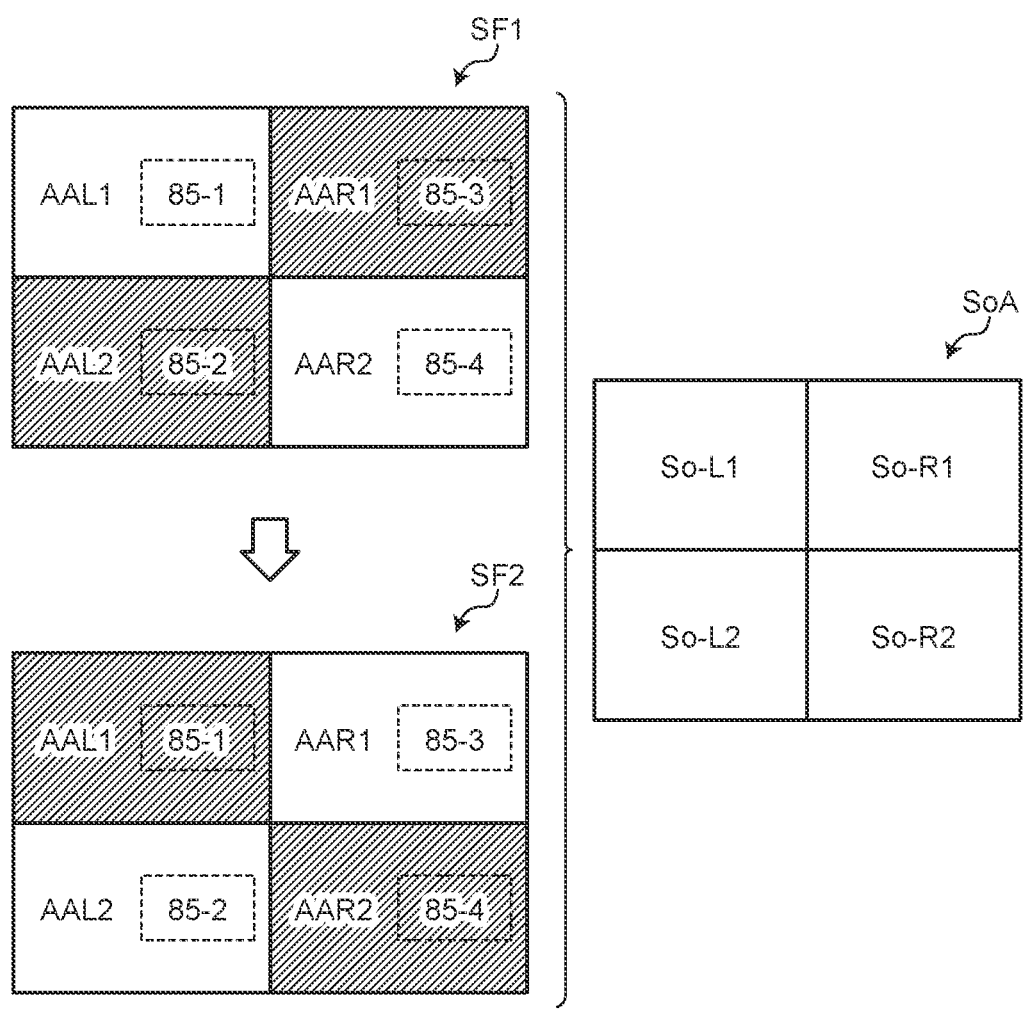
FIG. 18 is an explanatory diagram for explaining the detection operation example of the detection device according to the second modification.

FIG. 17 is an explanatory chart schematically illustrating a lighting pattern of the light-emitting elements and a detection operation example of the optical sensor in the detection device according to the second modification. FIG. 18 is an explanatory diagram for explaining the detection operation example of the detection device according to the second modification.

As illustrated in FIGS. 17 and 18, the detection device 1C divides the one frame period F into the two sub-frame periods SF1 and SF2, and controls the lighting and non-lighting of the light-emitting elements 85 and the detection of the photodiodes 30 for each of the sub-frame periods SF1 and SF2.

As illustrated in FIGS. 17 and 18, the light source device 81 turns on the light-emitting elements 85-1 and 85-4 in the sub-frame period SF1. In the sub-frame period SF1, the light source device 81 does not turn on (turns off) the light-emitting elements 85-2 and 85-3 other than the light-emitting elements 85-1 and 85-4.

As illustrated in FIG. 18, in the sub-frame period SF1, the light-emitting elements 85-2 and 85-3 that are adjacent to the lit-up light-emitting element 85-1 at least in the row and column directions are unlit. The light-emitting elements 85-2 and 85-3 adjacent to the lit-up light-emitting element 85-4 at least in the row and column directions are unlit.

Then, as illustrated in FIGS. 17 and 18, the detection control circuit 11A outputs the block selection signal BSL1 to the gate line drive circuits 15A-L and 15B-L in the sub-frame period SF1. The detection control circuit 11A also outputs the block selection signal BSR2 to the gate line drive circuits 15A-R and 15B-R.

As illustrated in FIG. 18, in the sub-frame period SF1, the optical sensor 10 scans the photodiodes 30 in the detection block AAL1 using the gate line drive circuits 15A-L and 15B-L. In the sub-frame period SF1, the optical sensor 10 scans the photodiodes 30 in the detection block AAR2 using the gate line drive circuits 15A-R and 15B-R.

In the sub-frame period SF1, the photodiodes 30 in the detection blocks AAL2 and AAR1 other than the detection blocks AAL1 and AAR2 are not scanned.

In other words, based on the block selection signals BSL1 and BSR2, the light-emitting elements 85-1 and 85-4 that overlap the photodiodes 30 in the detection blocks AAL1 and AAR2 selected as detection blocks to be detected are lit. The light-emitting elements 85-2 and 85-3 that overlap the photodiodes 30 in the detection blocks AAL2 and AAR1 not to be detected different from the detection blocks AAL1 and AAR2 are unlit.

Then, as illustrated in FIG. 17, in the transmission period T4, the detection control circuit 11A outputs the sensor values So-L1 from the photodiodes 30 in the detection block AAL1 to the host IC 70. In the transmission period T5, the detection control circuit 11B outputs the sensor values So-R2 from the photodiodes 30 in the detection block AAR2 to the host IC 70. The host IC 70 acquires the sensor values So-L1 and So-R2 from the photodiodes 30 in the detection blocks AAL1 and AAR2. The sensor value storage circuit 72 of the host IC 70 stores therein the sensor values So-L1 and So-R2 acquired in the sub-frame period SF1.

Then, the light source device 81 turns on the light-emitting elements 85-2 and 85-3 in the sub-frame period SF2. In the sub-frame period SF2, the light source device 81 does not turn on (turns off) the light-emitting elements 85-1 and 85-4 other than the light-emitting elements 85-2 and 85-3.

As illustrated in FIG. 18, in the sub-frame period SF2, the light-emitting elements 85-1 and 85-4 that are adjacent to the lit-up light-emitting element 85-2 at least in the row and column directions are unlit. The light-emitting elements 85-1 and 85-4 adjacent to the lit-up light-emitting element 85-3 at least in the row and column directions are unlit.

Then, the detection control circuit 11A outputs the block selection signal BSL2 to the gate line drive circuits 15A-L and 15B-L in the sub-frame period SF2. The detection control circuit 11A also outputs the block selection signal BSR1 to the gate line drive circuits 15A-R and 15B-R.

As illustrated in FIG. 18, in the sub-frame period SF2, the optical sensor 10 scans the photodiodes 30 in the detection block AAL2 using the gate line drive circuits 15A-L and 15B-L. In the sub-frame period SF2, the optical sensor 10 scans the photodiodes 30 in the detection block AAR1 using the gate line drive circuits 15A-R and 15B-R.

In the sub-frame period SF2, the photodiodes 30 in the detection blocks AAL1 and AAR2 other than the detection blocks AAL2 and AAR1 are not scanned.

In other words, based on the block selection signals BSL2 and BSR1, the light-emitting elements 85-2 and 85-3 that overlap the photodiodes 30 in the detection blocks AAL2 and AAR1 selected as detection blocks to be detected are lit. The light-emitting elements 85-1 and 85-4 that overlap the photodiodes 30 in the detection blocks AAL1 and AAR2 not to be detected different from the detection blocks AAL2 and AAR1 are unlit.

Then, as illustrated in FIG. 17, in the transmission period T4, the detection control circuit 11A outputs the sensor values So-L2 from the photodiodes 30 in the detection block AAL2 to the host IC 70. In the transmission period T5, the detection control circuit 11B outputs the sensor values So-R1 from the photodiodes 30 in the detection block AAR1 to the host IC 70. The host IC 70 acquires the sensor values So-L2 and So-R1 from the photodiodes 30 in the detection blocks AAL2 and AAR1. The sensor value storage circuit 72 of the host IC 70 stores therein the sensor values So-L2 and So-R1 acquired in the sub-frame period SF2.

As illustrated in FIG. 18, the combined data generation circuit 74 (refer to FIG. 3) combines the sensor values So acquired in the sub-frame periods SF1 and SF2. The combined data SoA generated by the combined data generation circuit 74 is made up of the sensor values So-L1, So-L2, So-R1, and So-R2.

Specifically, the sensor values So-L1 and So-R2 are the sensor values acquired in the sub-frame period SF1. The sensor values So-L2 and So-R1 are the sensor values acquired in sub-frame period SF2. The image generation circuit 77 (refer to FIG. 3) generates the image based on the combined data SoA.

In the second modification, the light-emitting elements 85 (for example, the light-emitting elements 85-1 and 85-4) that are lit up in the same sub-frame period SF are adjacent in an oblique direction, but the light-emitting elements 85 adjacent to the lit-up light-emitting elements 85 at least in the row and column directions are unlit. Thus, in the same manner as in the first and the second embodiments described above, the light-emitting elements 85 (for example, the light-emitting elements 85-2 and 85-3) adjacent to the lit-up light-emitting elements 85 in the row and column directions are unlit, so that the target object 100 as a target of detection is not irradiated with oblique light from the adjacent light-emitting elements 85 (for example, the light-emitting elements 85-2 and 85-3).

In the second modification, the example has been illustrated in which the light-emitting elements 85 are arranged in two rows and two columns, and the detection blocks AAL and AAR are also divided into two rows and two columns. However, the number and arrangement of the light-emitting elements 85, and the number and arrangement of the multiple detection blocks AAL and AAR are not limited to this example, but can be changed as appropriate.

While the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiments and the modifications described above.

What is claimed is:

1. A detection device comprising:
a plurality of photodiodes that are provided on a substrate;
a plurality of light-emitting elements that are arranged so as to face the photodiodes; and
a light-transmitting placement substrate that is disposed between the photodiodes and the light-emitting elements and on which a plurality of target objects are to be placed, wherein
the photodiodes, the placement substrate, and the light-emitting elements are arranged in the order as listed, in a direction orthogonal to the substrate,
a light-emitting element of the light-emitting elements corresponding to the photodiode to be detected is controlled to be lit, and another light-emitting element of the light-emitting elements corresponding to the photodiode not to be detected is controlled to be unlit, the photodiodes to be detected output sensor values based on light from the lit-up light-emitting elements, and the light-emitting elements adjacent to the lit-up light-emitting elements at least in row and column directions are controlled to be unlit.

2. The detection device according to claim 1, wherein the photodiode to be detected and the light-emitting element corresponding to the photodiode to be detected is arranged such that the photodiode to be detected and the light-emitting element overlap each other in plan view.

3. The detection device according to claim 1, wherein a plurality of sub-frame periods are provided that are obtained by dividing a frame period to acquire the sensor values from the respective photodiodes arranged in a detection area, the light-emitting elements are controlled to be sequentially lit for the sub-frame periods, the photodiodes to be detected corresponding to the lit-up light-emitting elements sequentially output the sensor values for the sub-frame periods, and the detection device further comprises an image generation circuit that is configured to generate one image by combining the sensor values for the sub-frame periods based on the sensor values output for each of the sub-frame periods and position information on the photodiodes in the detection area.

4. The detection device according to claim 1, further comprising:

a plurality of gate lines;

a plurality of signal lines;

a gate line drive circuit that is coupled to the gate lines; and a detection circuit coupled to the signal lines, wherein the photodiodes are arranged in a matrix in a row-column configuration in a detection area of the substrate and are coupled to the gate lines and the signal lines.

5. The detection device according to claim 4, wherein the gate line drive circuit is configured to sequentially supply gate drive signals to the gate lines, and the photodiodes to be detected that are selected based on the gate drive signals sequentially output the sensor values.

6. The detection device according to claim 1, wherein the photodiodes and the light-emitting elements are arranged in at least one column, and the photodiodes arranged in the one column sequentially output the sensor values.

7. The detection device according to claim 1, wherein the photodiodes and the light-emitting elements are arranged in at least a first column and a second column, the light-emitting elements arranged in the first column are controlled to be sequentially lit up, and the photodiodes to be detected among the photodiodes arranged in the first column sequentially output the sensor values, the light-emitting elements arranged in the second column are controlled to be sequentially lit up, and the photodiodes to be detected among the photodiodes arranged in the second column sequentially output the sensor values, and in a given sub-frame period, a row of the light-emitting element lit up in the first column differs from that of the light-emitting element lit up in the second column, and a row of the photodiode to be detected in the first column differs from that of the photodiode to be detected in the second column.

8. The detection device according to claim 7, further comprising:

a plurality of gate lines;

a plurality of signal lines; and a pair of gate line drive circuits that are coupled to the gate lines, wherein the gate lines comprise a plurality of first column gate lines that are coupled to the photodiodes arranged in the first column and a plurality of second column gate lines that are provided separately from the first column gate lines and coupled to the photodiodes arranged in the second column, the first column gate lines are coupled to one of the pair of gate line drive circuits, and the second column gate lines are coupled to the other of the pair of gate line drive circuits.

9. The detection device according to claim 1, wherein the light-emitting elements that overlap the photodiodes not to be detected that are adjacent to the photodiodes to be detected are controlled to be unlit.

10. The detection device according to claim 1, further comprising an optical filter layer that is provided between the photodiodes and the placement substrate, wherein the optical filter layer comprises a plurality of light guide paths, at least some of which overlapping the photodiodes, and a light-blocking portion that has higher optical absorbance than that of the light guide paths.

* * * * *